US012658118B2

(12) United States Patent
Bae et al.

(10) Patent No.: US 12,658,118 B2
(45) Date of Patent: Jun. 16, 2026

(54) DRIVING CIRCUIT AND ELECTRONIC DEVICE INCLUDING THE SAME

(71) Applicant: Samsung Display Co., LTD., Yongin-si (KR)

(72) Inventors: Jongman Bae, Yongin-si (KR); Jinyoung Jeon, Yongin-si (KR); Woo-Chul Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/170,797

(22) Filed: Apr. 4, 2025

(65) Prior Publication Data

US 2025/0349245 A1 Nov. 13, 2025

(30) Foreign Application Priority Data

May 8, 2024 (KR) ........................ 10-2024-0060527

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0819* (2013.01); *G09G 2300/0842* (2013.01); *G09G 2300/0861* (2013.01); *G09G 2310/027* (2013.01); *G09G 2310/04* (2013.01); *G09G 2310/08* (2013.01); *G09G 2330/021* (2013.01); *G09G 2340/0435* (2013.01); *G09G 2370/04* (2013.01)

(58) Field of Classification Search
CPC ................... G09G 3/32; G09G 3/3233; G09G 2300/0819; G09G 2300/0842; G09G 2300/0861; G09G 2310/027; G09G 2310/04; G09G 2310/08; G09G 2330/021; G09G 2340/0435; G09G 2370/04
See application file for complete search history.

(56) References Cited

U.S. PATENT DOCUMENTS 11,423,817 B2 * 8/2022 Jung .................... G09G 3/2092
11,727,848 B2 * 8/2023 Seo ...................... G09G 3/3233 345/55
11,798,463 B2 * 10/2023 Kim ..................... G09G 3/3233
11,929,020 B2 3/2024 Yoon et al.
(Continued)

FOREIGN PATENT DOCUMENTS

KR 1020220017119 A 2/2022
KR 1020220105892 A 7/2022
(Continued)

*Primary Examiner* — Adam J Snyder
(74) *Attorney, Agent, or Firm* — CANTOR COLBURN LLP

(57) ABSTRACT

An electronic device includes a processor that outputs a transmit signal including a parameter and an image signal, a display panel, and a driving circuit that receives the transmit signal and performs control such that an image corresponding to the image signal is displayed on the display panel based on the parameter included in the transmit signal. The parameter includes a first command indicating a multi-frequency mode, a second command indicating a number of display areas of the display panel, and a third command indicating whether the image signal corresponding to each of the display areas is transmitted.

20 Claims, 13 Drawing Sheets

(56) References Cited

U.S. PATENT DOCUMENTS

| | | | | |
|---|---|---|---|---|
| 11,935,447 | B2 | 3/2024 | Kim et al. | |
| 12,249,275 | B2 * | 3/2025 | Kim | G09G 3/3233 |
| 2021/0201746 | A1 * | 7/2021 | Seo | G09G 3/3233 |
| 2022/0189363 | A1 * | 6/2022 | Jung | G09G 3/2092 |
| 2023/0178003 | A1 * | 6/2023 | Kim | G09G 3/3233 |
| 2024/0021128 | A1 | 1/2024 | Lee et al. | |
| 2025/0029545 | A1 * | 1/2025 | Kim | G09G 3/3233 |

FOREIGN PATENT DOCUMENTS

| | | | |
|---|---|---|---|
| KR | 1020220128160 | A | 9/2022 |
| KR | 1020230118211 | A | 8/2023 |

* cited by examiner

DRIVING CIRCUIT AND ELECTRONIC DEVICE INCLUDING THE SAME

This application claims priority to Korean Patent Application No. 10-2024-0060527, filed on May 8, 2024, and all the benefits accruing therefrom under 35 U.S.C. § 119, the content of which in its entirety is herein incorporated by reference.

BACKGROUND

1. Field

Embodiments of the disclosure described herein relate to an electronic device.

2. Description of the Related Art

An electronic device includes pixels connected to data lines and scan lines. Each of the pixels includes a light-emitting element and a pixel circuit for controlling the light-emitting element. The pixel circuit may provide the light-emitting element with a current, the amount of which corresponds to a data signal. In this case, there may be generated a light whose luminance corresponds to the amount of current flowing through the light-emitting element.

One way to improve the display quality of images displayed on an electronic device is to increase the operating frequency of the electronic device. One of the ways to reduce the power consumption of the electronic device is to lower the operating frequency of the electronic device.

SUMMARY

Embodiments of the disclosure provide an electronic device capable of operating at various driving frequencies.

In an embodiment of the disclosure, an electronic device includes a processor that outputs a transmit signal including a parameter and an image signal, a display panel, and a driving circuit that receives the transmit signal and performs control such that an image corresponding to the image signal is displayed on the display panel based on the parameter included in the transmit signal. The parameter includes a first command indicating a multi-frequency mode, a second command indicating a number of display areas of the display panel, and a third command indicating whether the image signal corresponding to each of the display areas is transmitted.

In an embodiment, the driving circuit may include a memory that stores the image signal.

In an embodiment, when the second command indicates that the number of display areas is three, the image signal may include a first image signal corresponding to a first display area, a second image signal corresponding to a second display area, and a third image signal corresponding to a third display area.

In an embodiment, when the first command indicates the multi-frequency mode, the image signal may include at least one of the first image signal, the second image signal, and the third image signal.

In an embodiment, the parameter may further include a fourth command indicating information about a last horizontal line of the first display area and a fifth command indicating information about a last horizontal line of the second display area.

In an embodiment, the driving circuit may ignore the fourth command when the third command indicates that the first, second, and third image signals are all transmitted.

In an embodiment, the driving circuit may generate a vertical synchronization signal, a data enable signal, and a clock signal in response to the parameter.

In an embodiment, the driving circuit may deactivate the data enable signal and the clock signal for a time duration corresponding to the second display area and the third display area based on the fourth command when the third command indicates that the first image signal of the first, second, and third image signals is transmitted.

In an embodiment, the driving circuit may deactivate the data enable signal and the clock signal for a time duration corresponding to the second display area based on the fourth command and the fifth command when the third command indicates that the first and third image signals of the first, second, and third image signals are transmitted.

In an embodiment, each of the first, second, and third display areas may include a plurality of odd-numbered slice areas and a plurality of even-numbered slice areas.

In an embodiment, the first image signal may include first left image signals corresponding to the plurality of odd-numbered slice areas of the first display area and first right image signals corresponding to the plurality of even-numbered slice areas of the first display area. The second image signal may include second left image signals corresponding to the plurality of odd-numbered slice areas of the second display area and second right image signals corresponding to the plurality of even-numbered slice areas of the second display area. The third image signal may include third left image signals corresponding to the plurality of odd-numbered slice areas of the third display area and third right image signals corresponding to the plurality of even-numbered slice areas of the third display area.

In an embodiment, the parameter may further include a sixth command indicating whether a first left image signal and a first right image signal corresponding to the first display area, among the first left image signals and the first right image signals, are transmitted, a seventh command indicating whether a second left image signal and a second right image signal corresponding to the second display area, among the second right image signals and the second right image signals, are transmitted, and an eighth command indicating whether a third left image signal and a third right image signal of the third display area, among the third left image signals and the third right image signals, are transmitted.

In an embodiment, the driving circuit may include a memory that stores the first left image signal, the first right image signal, the second left image signal, the second right image signal, the third left image signal, and the third right image signal.

In an embodiment of the disclosure, a driving circuit includes a driving controller that receives a transmit signal including a parameter and an image signal and outputs an image data signal, and a data driving circuit that converts the image data signal into a data signal. The parameter includes a first command indicating a multi-frequency mode, a second command indicating a number of display areas of a display panel, and a third command indicating whether the image signal corresponding to each of the display areas is transmitted.

In an embodiment, when the first command indicates the multi-frequency mode and the second command indicates that the number of display areas is three, the image signal may include at least one of a first image signal corresponding to a first display area, a second image signal corresponding to a second display area, and a third image signal corresponding to a third display area.

In an embodiment, the parameter may further include a fourth command indicating information about a last horizontal line of the first display area and a fifth command indicating information about a last horizontal line of the second display area.

In an embodiment, the driving circuit may ignore the fourth command when the third command indicates that the first, second, and third image signals are all transmitted.

In an embodiment, the driving circuit may generate a vertical synchronization signal, a data enable signal, and a clock signal in response to the parameter.

In an embodiment, the driving circuit may deactivate the data enable signal and the clock signal for a time duration corresponding to the second display area and the third display area based on the fourth command when the third command indicates that the first image signal of the first, second, and third image signals is transmitted.

In an embodiment, the driving circuit may deactivate the data enable signal and the clock signal for a time duration corresponding to the second display area based on the fourth command and the fifth command when the third command indicates that the first and third image signals of the first, second, and third image signals are transmitted.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
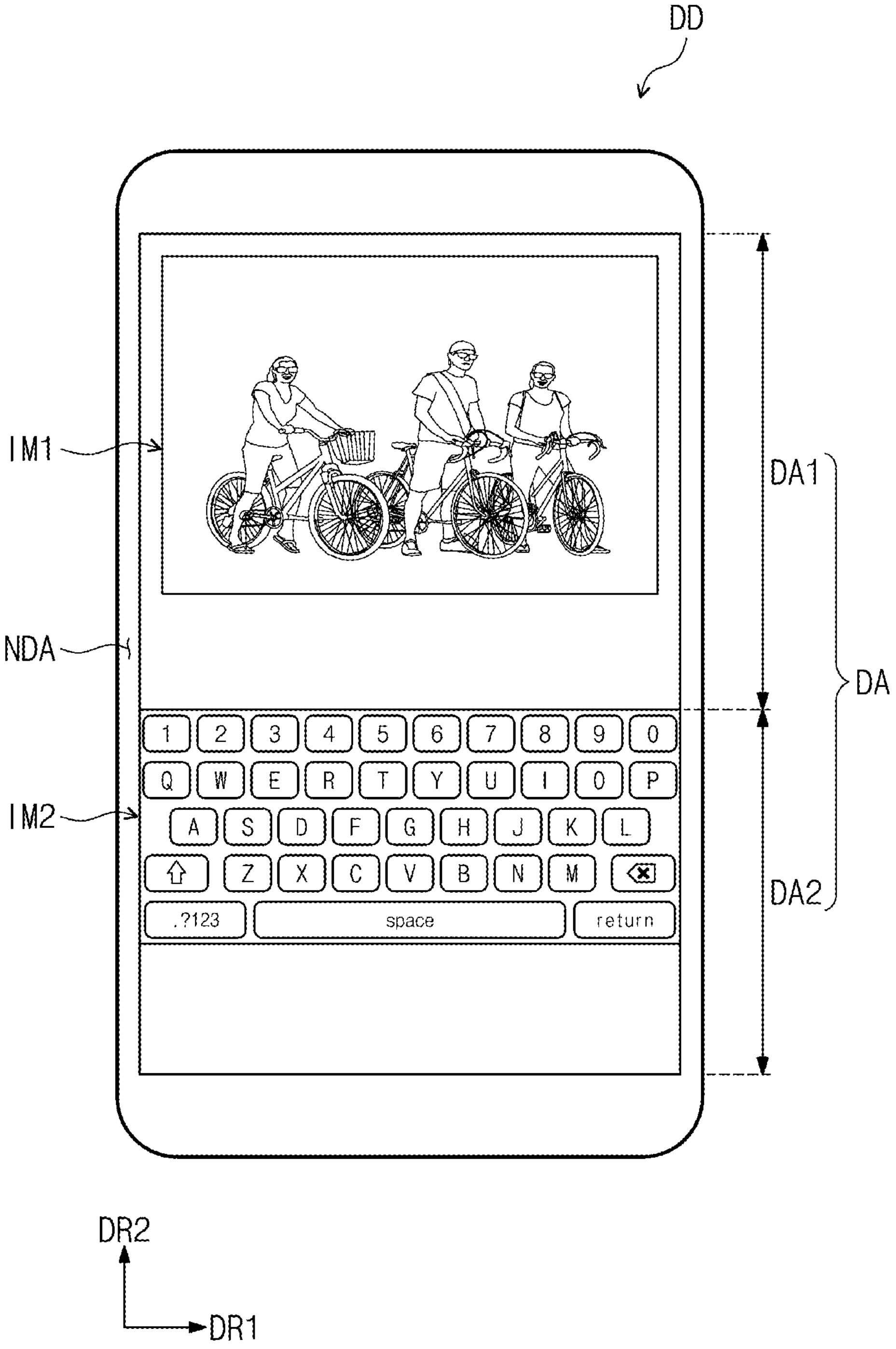
FIG. 1 illustrates an embodiment of an electronic device according to the disclosure.

In the specification, the expression that a first component (or region, layer, part, etc.) is "on", "connected to", or "coupled to" a second component means that the first component is directly on, connected to, or coupled to the second component or means that a third component is interposed therebetween.

The same reference numerals/signs refer to the same components. In addition, in drawings, thicknesses, proportions, and dimensions of components may be exaggerated to describe the technical features effectively. The term "and/or" includes one or more combinations of the associated listed items.

The terms "first", "second", etc. are used to describe various components, but the components are not limited by the terms. The terms are only used to distinguish one component from another component. For example, without departing from the scope and spirit of the invention, a first component may be referred to as a "second component", and similarly, the second component may be referred to as the "first component". The articles A, "an", and "the" are singular in that they have a single referent, but the use of the singular form in the specification should not preclude the presence of more than one referent.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

The term "processor" or "controller" as used herein is intended to mean a hardware component such as a circuitry that performs a predetermined function. The hardware component may include a field-programmable gate array ("FPGA") or an application-specific integrated circuit ("ASIC"), for example.

Unless otherwise defined, all terms (including technical terms and scientific terms) used in this specification have the same meaning as commonly understood by those skilled in the art to which the present disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

Below, embodiments of the disclosure will be described with reference to drawings.

FIG. 1 illustrates an embodiment of an electronic device according to the disclosure.

Referring to FIG. 1, a portable terminal is illustrated in an embodiment of an electronic device DD according to the disclosure. The portable terminal may include a tablet personal computer ("PC"), a smartphone, a personal digital assistant ("PDA"), a portable multimedia player ("PMP"), a game console, a wristwatch-type electronic device, etc. However, the disclosure is not limited thereto. The disclosure may be used for small and medium-sized electronic devices such as a personal computer, a notebook computer, a kiosk, a car navigation unit, and a camera, in addition to large-sized electronic devices such as a television or an outside billboard. The above embodiments are only illustrative, and it is obvious that the electronic device DD may be applied to any other electronic device(s) without departing from the concept of the invention.

As illustrated in FIG. 1, a display surface on which a first image IM1 and a second image IM2 are displayed is parallel to a plane defined by a first direction DR1 and a second direction DR2. The electronic device DD includes a plurality of areas that are distinguished from each other on the display surface. The display surface includes a display area DA in which the first image IM1 and the second image IM2 are displayed, and a non-display area NDA next (adjacent) to the display area DA. The non-display area NDA may be referred to as a bezel area. In an embodiment, the display area DA may be in the shape of a quadrangle. The non-display area NDA surrounds the display area DA. Also, although not illustrated, in an embodiment, the electronic device DD may include a partially curved shape.

The display area DA of the electronic device DD includes a first display area DA1 and a second display area DA2. In a predetermined application program, the first image IM1 may be displayed in the first display area DA1, and the second image IM2 may be displayed in the second display area DA2. In an embodiment, the first image IM1 may be an image (e.g., a video) with a relatively fast change period, and the second image IM2 may be an image (e.g., a still image such as a photo or text information) with a relatively long change period, for example.

The operation mode of the electronic device DD may include a single frequency mode and a multi-frequency mode. In the single frequency mode, the electronic device DD may drive both the first display area DA1 and the second display area DA2 at a fundamental frequency. In the multi-frequency mode, the electronic device DD in an embodiment may drive the first display area DA1 where the first image IM1 is displayed at a first operating frequency, and may drive the second display area DA2 where the second image IM2 is displayed, at a second operating frequency. In an embodiment, the first operating frequency may be equal to or higher than the fundamental frequency. In an embodiment, the second operating frequency may be lower than the first operating frequency. The electronic device DD may reduce power consumption by decreasing the operating frequency of the second display area DA2.

The size of each of the first display area DA1 and the second display area DA2 may be determined in advance and may be changed by an application program.

In an embodiment, when the still image is displayed in the first display area DA1 and the video is displayed in the second display area DA2, the first display area DA1 may be driven at a frequency lower than the fundamental frequency, and the second display area DA2 may be driven at a frequency higher than or equal to the fundamental frequency.

In an embodiment, the display area DA may be divided into three or more display areas; in this case, an operating frequency of each of the three or more display areas may be determined depending on a type (e.g., a still image or a video) of an image that is displayed therein.

Figure 2:
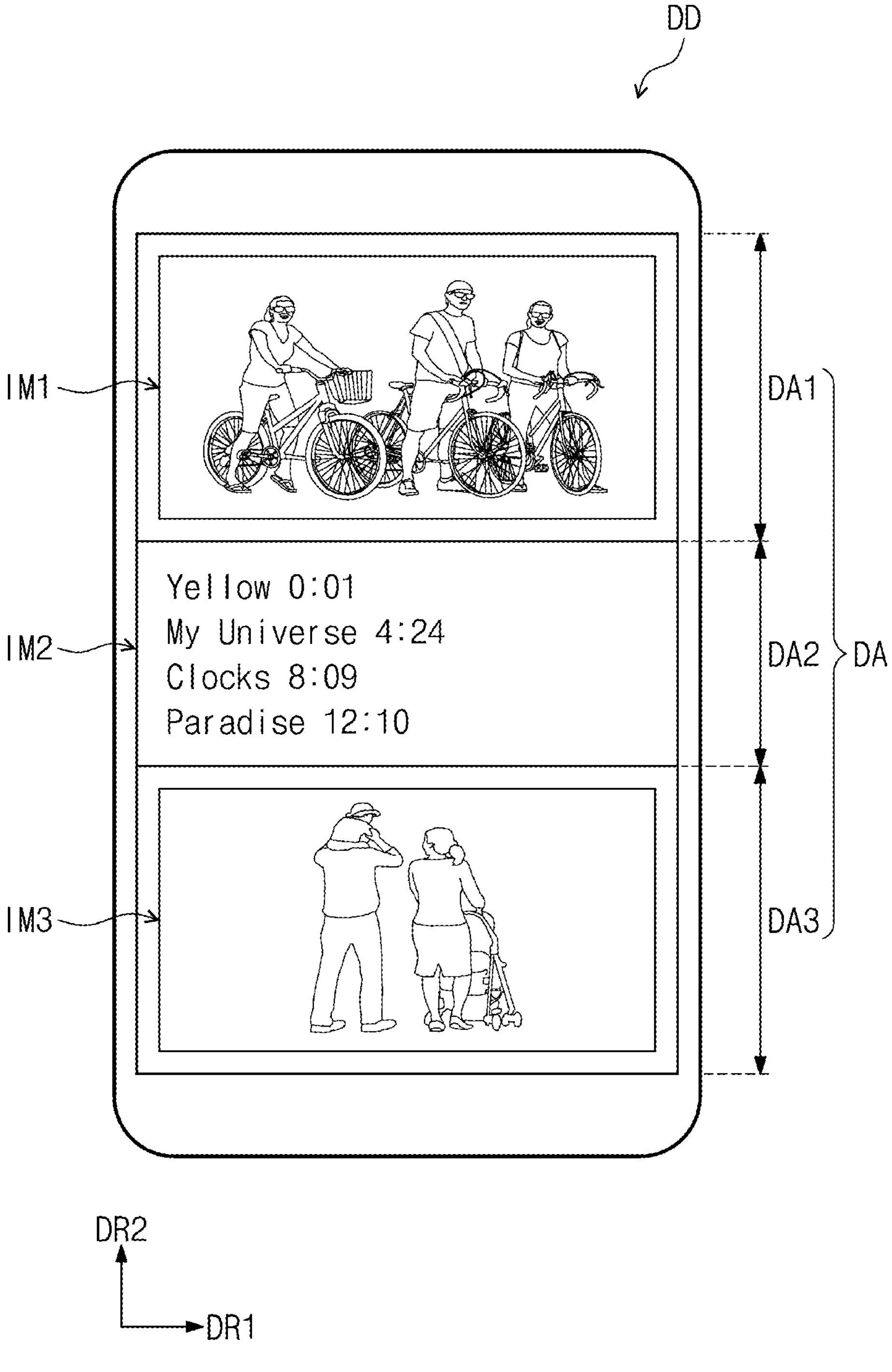
FIG. 2 illustratively illustrates an embodiment of an image displayed on an electronic device according to the disclosure.

FIG. 2 illustratively illustrates an embodiment of an image displayed on the electronic device DD according to the disclosure.

Referring to FIG. 2, the display area DA of the electronic device DD may include the first display area DA1, the second display area DA2, and a third display area DA3. In a predetermined application program, the first image IM1 may be displayed in the first display area DA1, the second image IM2 may be displayed in the second display area DA2, and a third image IM3 may be display in the third display area DA3. In an embodiment, the first image IM1 and the third image IM3 may be an image (e.g., a video) with a relatively fast change period, and the second image IM2 may be an image (e.g., a still image such as a photo or text information) with a relatively long change period, for example.

In the single frequency mode, the electronic device DD may drive all of the first display area DA1, the second display area DA2, and the third display area DA3 at a fundamental frequency. In the multi-frequency mode, the electronic device DD in an embodiment may drive the first display area DA1 where the first image IM1 is displayed at a first operating frequency and the third display area DA3 where the third image IM3 is displayed at the first operating frequency, individually and may drive the second display area DA2 where the second image IM2 is displayed, at a second operating frequency. In an embodiment, the first operating frequency may be equal to or higher than the fundamental frequency. In an embodiment, the second operating frequency may be lower than the first operating frequency. The electronic device DD may reduce power consumption by decreasing the operating frequency of the second display area DA2.

The size of each of the first display area DA1, the second display area DA2, and the third display area DA3 may be a preset size, and may be changed by an application program.

In an embodiment, when the still image is displayed in the first display area DA1 and the video is displayed in the second display area DA2, the first display area DA1 may be driven at a frequency lower than the fundamental frequency, and the second display area DA2 may be driven at a frequency higher than or equal to the fundamental frequency.

Figure 3A:
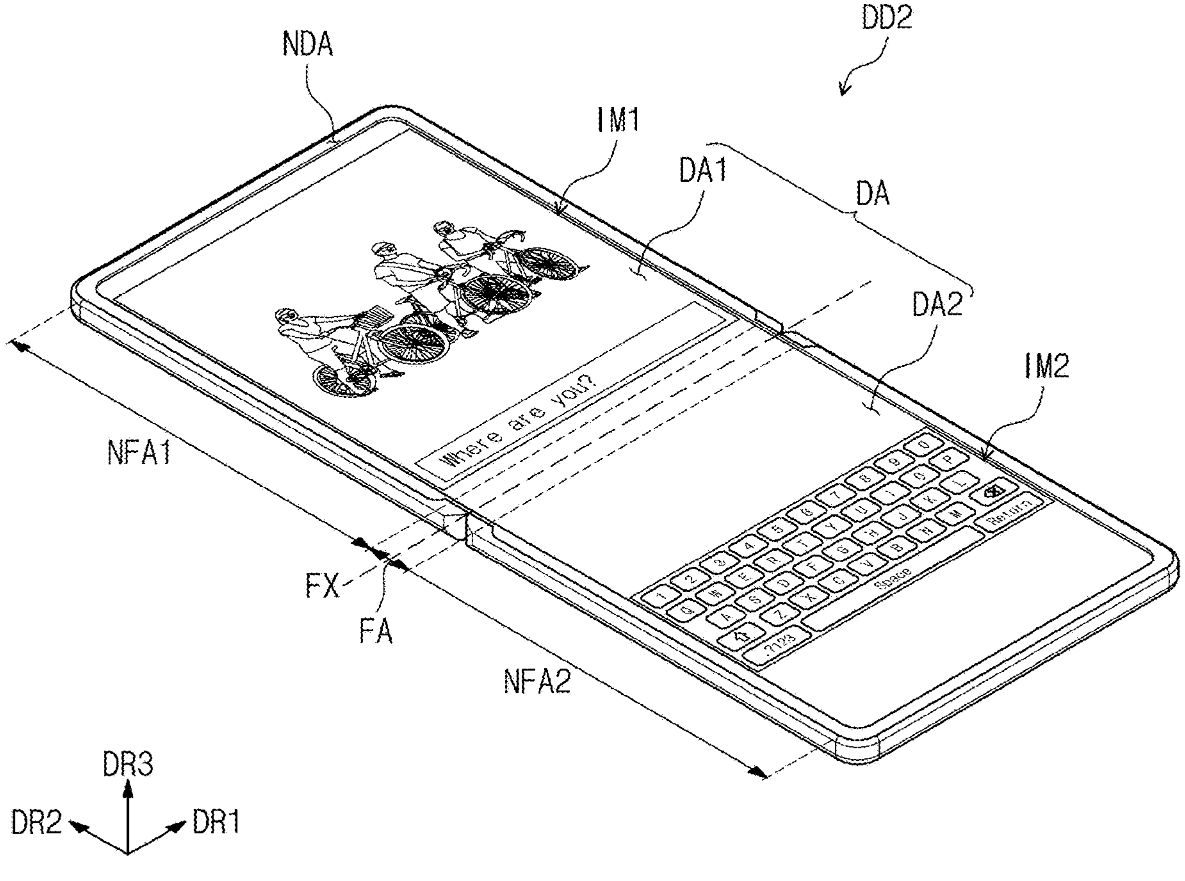
FIGS. 3A and 3B are perspective views of an embodiment of an electronic device, according to the disclosure.
Figure 3B:
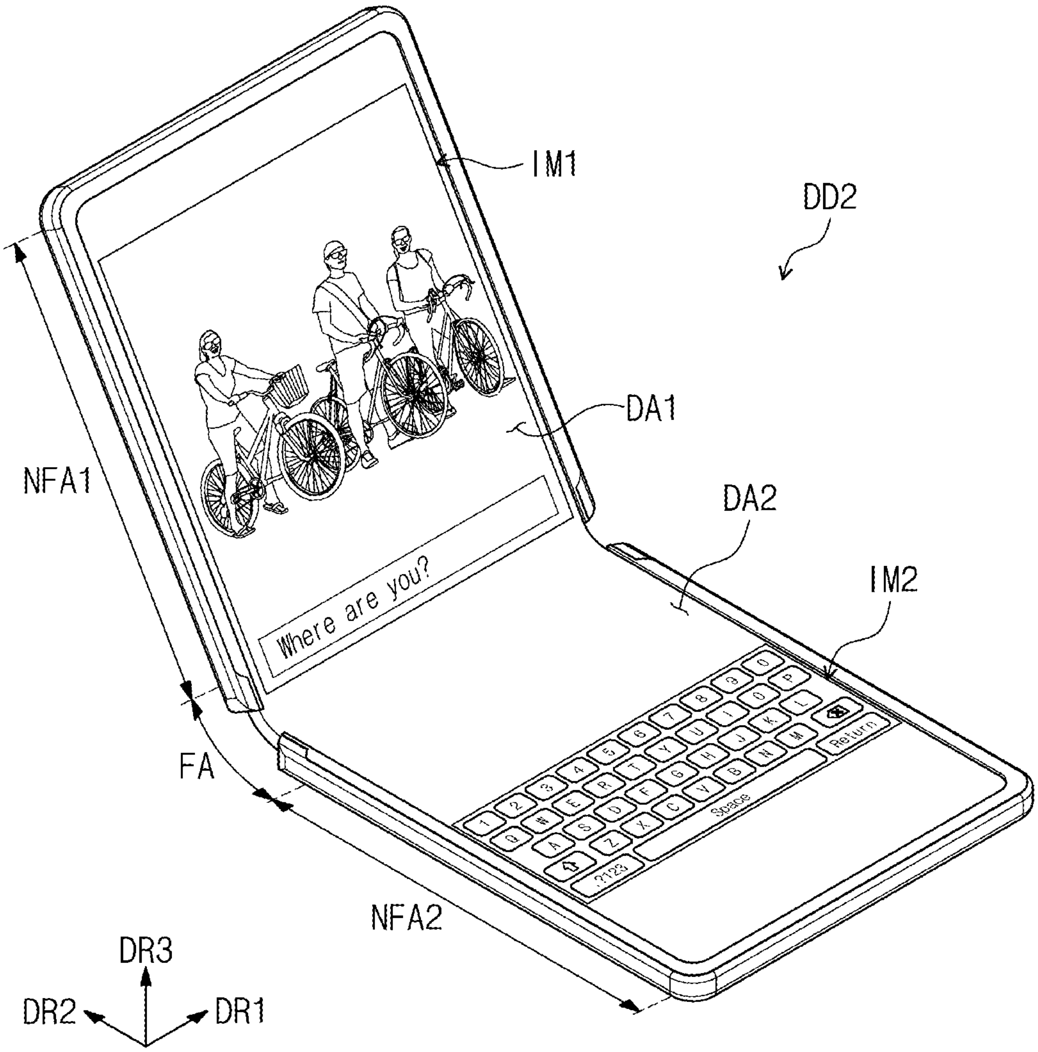

FIGS. 3A and 3B are perspective views of an embodiment of an electronic device DD2, according to the disclosure. FIG. 3A shows the electronic device DD2 unfolded, and FIG. 3*b* shows the electronic device DD2 folded.

As shown in FIGS. 3A and 3B, the electronic device DD2 includes the display area DA and the non-display area NDA. The electronic device DD2 may display an image through the display area DA. The display area DA may include the plane defined by the first direction DR1 and the second direction DR2, with the electronic device DD2 unfolded. A thickness direction of the electronic device DD2 may be parallel to a third direction DR3 intersecting the first direction DR1 and the second direction DR2. Accordingly, front surfaces (or upper surfaces) and bottom surfaces (or lower surfaces) of members constituting the electronic device DD2 may be defined with respect to the third direction DR3. The non-display area NDA may be referred to as a bezel area. In an embodiment, the display area DA may be in the shape of a quadrangle. The non-display area NDA surrounds the display area DA.

The display area DA may include a first non-folding area NFA1, a folding area FA, and a second non-folding area NFA2. The folding area FA may be bent about a folding axis FX extending in the first direction DR1.

When the electronic device DD2 is folded, the first non-folding area NFA1 and the second non-folding area NFA2 may face each other. Accordingly, in a state where the electronic device DD2 is fully folded, the display area DA may not be exposed to the outside, which may be also referred to as "in-folding". This is only an illustrative embodiment, and the operation of the electronic device DD2 is not limited thereto.

In an embodiment of the disclosure, when the electronic device DD2 is folded, the first non-folding area NFA1 and the second non-folding area NFA2 may be opposite to each other. Accordingly, in a state where the electronic device DD2 is folded, the first non-folding area NFA1 may be exposed to the outside, which may be also referred to as "out-folding".

Only one of the in-folding or the out-folding of the electronic device DD2 may be possible. In an alternative embodiment, both the in-folding and the out-folding of the electronic device DD2 may be possible. In this case, the same area of the electronic device DD2, e.g., the folding area FA may be in-folded or out-folded (or may folded inwardly and outwardly). In an alternative embodiment, a partial area of the electronic device DD2 may be in-folded, and the remaining area thereof may be out-folded.

One folding area and two non-folding areas are illustrated in FIGS. 3A and 3B, but the number of folding areas and the number of non-folding areas are not limited thereto. In an embodiment, the electronic device DD2 may include a plurality of non-folding areas, the number of which is more than two, and a plurality of folding areas; each of the plurality of folding areas may be interposed between non-folding areas next (adjacent) to each other from among the plurality of non-folding areas, for example.

FIGS. 3A and 3B illustrate that the folding axis FX is parallel to the minor axis of the electronic device DD2. However, the disclosure is not limited thereto. In an embodiment, the folding axis FX may extend in a direction parallel to the major axis of the electronic device DD, e.g., the second direction DR2, for example.

FIGS. 3A and 3B illustrate that the first non-folding area NFA1, the folding area FA, and the second non-folding area NFA2 may be sequentially arranged in the second direction DR2. However, the disclosure is not limited thereto. In an embodiment, the first non-folding area NFA1, the folding area FA, and the second non-folding area NFA2 may be sequentially arranged in the first direction DR1, for example.

The plurality of display areas DA1 and DA2 may be defined in the display area DA of the electronic device DD. FIG. 3A illustrates the two display areas DA1 and DA2 as an illustrative embodiments. However, the number of display areas DA1 and DA2 is not limited thereto.

The plurality of display areas DA1 and DA2 may include the first display area DA1 and the second display area DA2. In an embodiment, the first display area DA1 may be an area where the first image IM1 is displayed, and the second display area DA2 may be an area in which the second image IM2 is displayed, for example. In an embodiment, the first image IM1 may be a video, and the second image IM2 may be a still image, for example.

The electronic device DD2 in an embodiment may operate differently depending on an operation mode. The operation mode of the electronic device DD2 may include a single frequency mode and a multi-frequency mode. In the single frequency mode, the electronic device DD2 may drive both the first display area DA1 and the second display area DA2 at a fundamental frequency. In the multi-frequency mode, the electronic device DD2 in an embodiment may drive the first display area DA1 where the first image IM1 is displayed at a first operating frequency, and may drive the second display area DA2 where the second image IM2 is displayed, at a second operating frequency. In an embodiment, the first operating frequency may be higher than or equal to the fundamental frequency. The second operating frequency may be lower than the first operating frequency.

The size of each of the first display area DA1 and the second display area DA2 may be determined in advance and may be changed by an application program. In an embodiment, the first display area DA1 may correspond to the first non-folding area NFA1, and the second display area DA2 may correspond to the second non-folding area NFA2. In addition, a first portion of the folding area FA may correspond to the first display area DA1, and a second portion of the folding area FA may correspond to the second display area DA2.

In an embodiment, the entirety of the folding area FA may correspond to only one of the first display area DA1 and the second display area DA2.

In an embodiment, the first display area DA1 may correspond to the first portion of the first non-folding area NFA1, and the second display area DA2 may correspond to the second portion of the first non-folding area NFA1, the folding area FA, and the second non-folding area NFA2. That is, the size of the second display area DA2 may be larger than the size of the first display area DA1.

In an embodiment, the first display area DA1 may correspond to the first non-folding area NFA1, the folding area FA, and the first portion of the second non-folding area NFA2, and the second display area DA2 may correspond to the second portion of the second non-folding area NFA2. That is, the size of the first display area DA1 may be larger than the size of the second display area DA2.

As illustrated in FIG. 3B, in a state where the folding area FA is folded, the first display area DA1 may correspond to the first non-folding area NFA1, and the second display area DA2 may correspond to the folding area FA and the second non-folding area NFA2.

FIGS. 3A and 3B illustrate that the electronic device DD2 has one folding area, in an embodiment of an electronic device. However, the disclosure is not limited thereto. In an embodiment, the disclosure may also be applied to an electronic device having two or more folding areas, a rollable electronic device, or a slidable electronic device, for example.

Figure 4A:
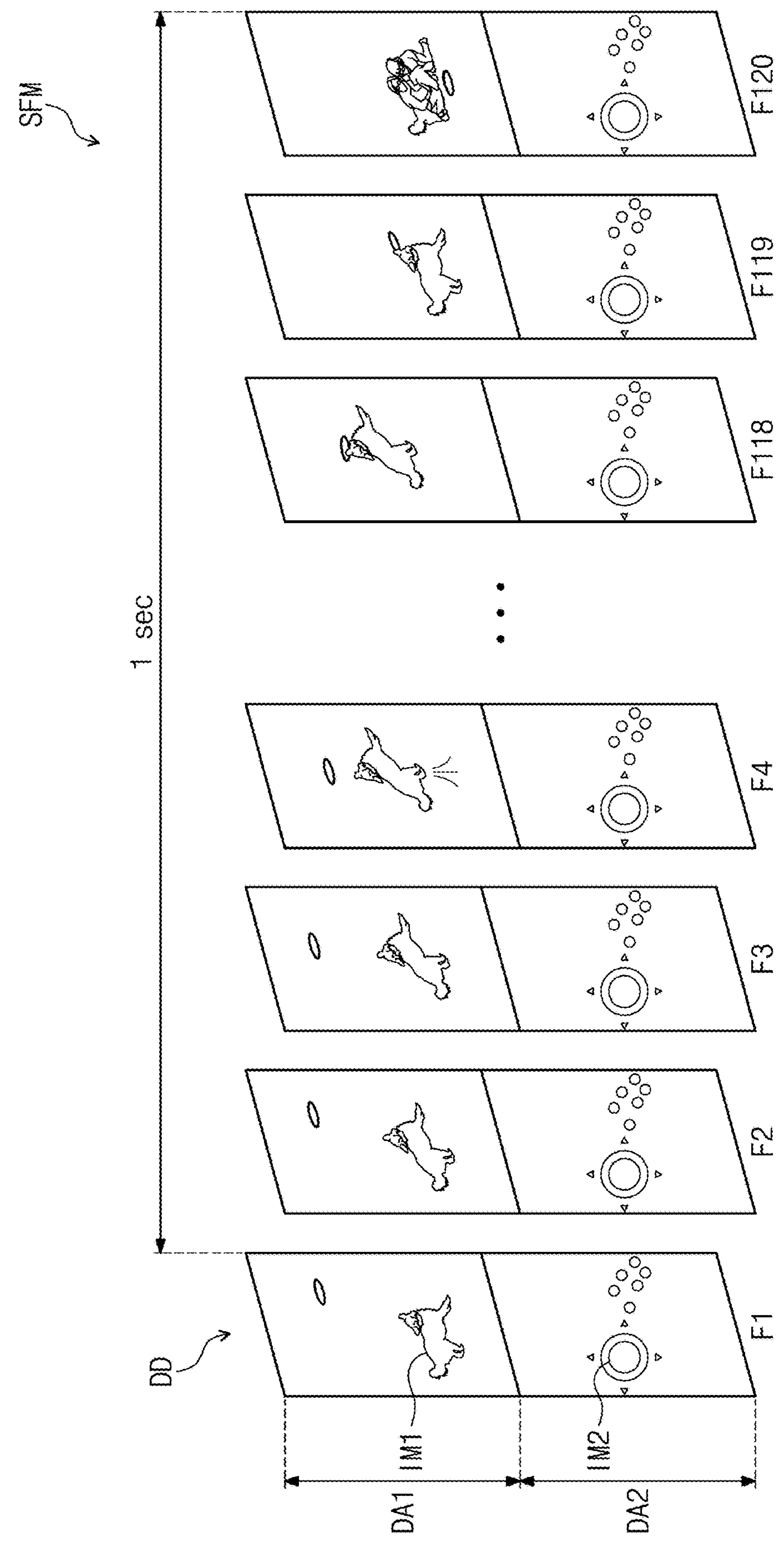
FIG. 4A is a diagram for describing an operation of an electronic device in a single frequency mode.
Figure 4B:
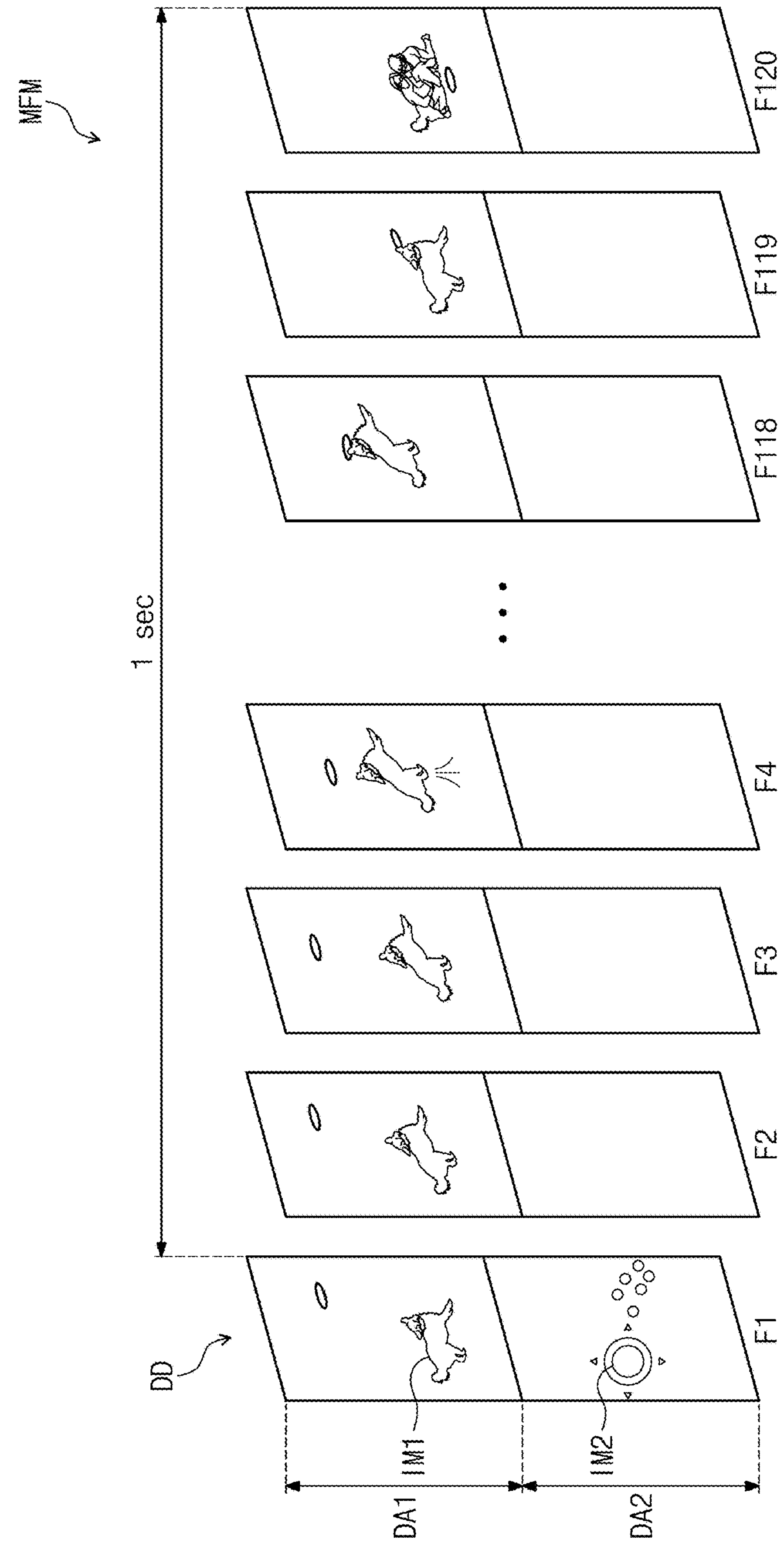
FIG. 4B is a diagram for describing an operation of an electronic device in a multi-frequency mode.

FIG. 4A is a diagram for describing an operation of an electronic device in a single frequency mode. FIG. 4B is a diagram for describing an operation of an electronic device in a multi-frequency mode.

Referring to FIG. 4A, the first image IM1 that is displayed in the first display area DA1 may be a video, and the second image IM2 that is displayed in the second display area DA2 may be an image (e.g., a game control keypad image) with a relatively long change period or a still image. The first image IM1 displayed in the first display area DA1 and the second image IM2 displayed in the second display area DA2 are illustrated in FIG. 4A in an embodiment, and various images may be displayed in the electronic device DD.

In a single frequency mode SFM, the operating frequencies of the first display area DA1 and the second display area DA2 of the electronic device DD are the fundamental frequency. In an embodiment, the fundamental frequency may be 120 hertz (Hz). In the single frequency mode SFM, images of first to 120-th frames F1 to F120 may be sequentially displayed in each of the first display area DA1 and the second display area DA2 of the electronic device DD for one second, for example.

Referring to FIG. 4B, in a multi-frequency mode MFM, the electronic device DD may set an operating frequency of the first display area DA1, in which the first image IM1 (i.e., a video) is displayed, as the first operating frequency, and may set an operating frequency of the second display area DA2, in which the second image IM2 (i.e., a still image) is displayed, as a second operating frequency lower than the first operating frequency. The first operating frequency may be 120 Hz, and the second operating frequency may be 1 Hz. The first operating frequency and the second operating frequency may be variously changed.

In the multi-frequency mode MFM, when the first drive frequency is 120 Hz and the second drive frequency is 1 Hz, data signals corresponding to the first image IM1 may be supplied to the first display area DA1 of the electronic device DD for one second in each of the first frame F1 to the 120-th frame F120, and data signals corresponding to the second image IM2 may be supplied to the second display area DA2 in the first frame F1 only. That is, because a new data signal is not provided to the second display area DA2 in the second to 120-th frames F2 to F120, the second image IM2 that is the same as that displayed in the first frame F1 may be displayed in the second to 120-th frames F2 to F120.

FIG. 4B illustratively shows an example where the first operating frequency is 120 Hz and the second operating frequency is 1 Hz in the multi-frequency mode MFM, but the disclosure is not limited thereto. The second operating frequency may be variously changed to frequencies lower than the first operating frequency, such as 60 Hz, 30 Hz, and 10 Hz.

Figure 5:
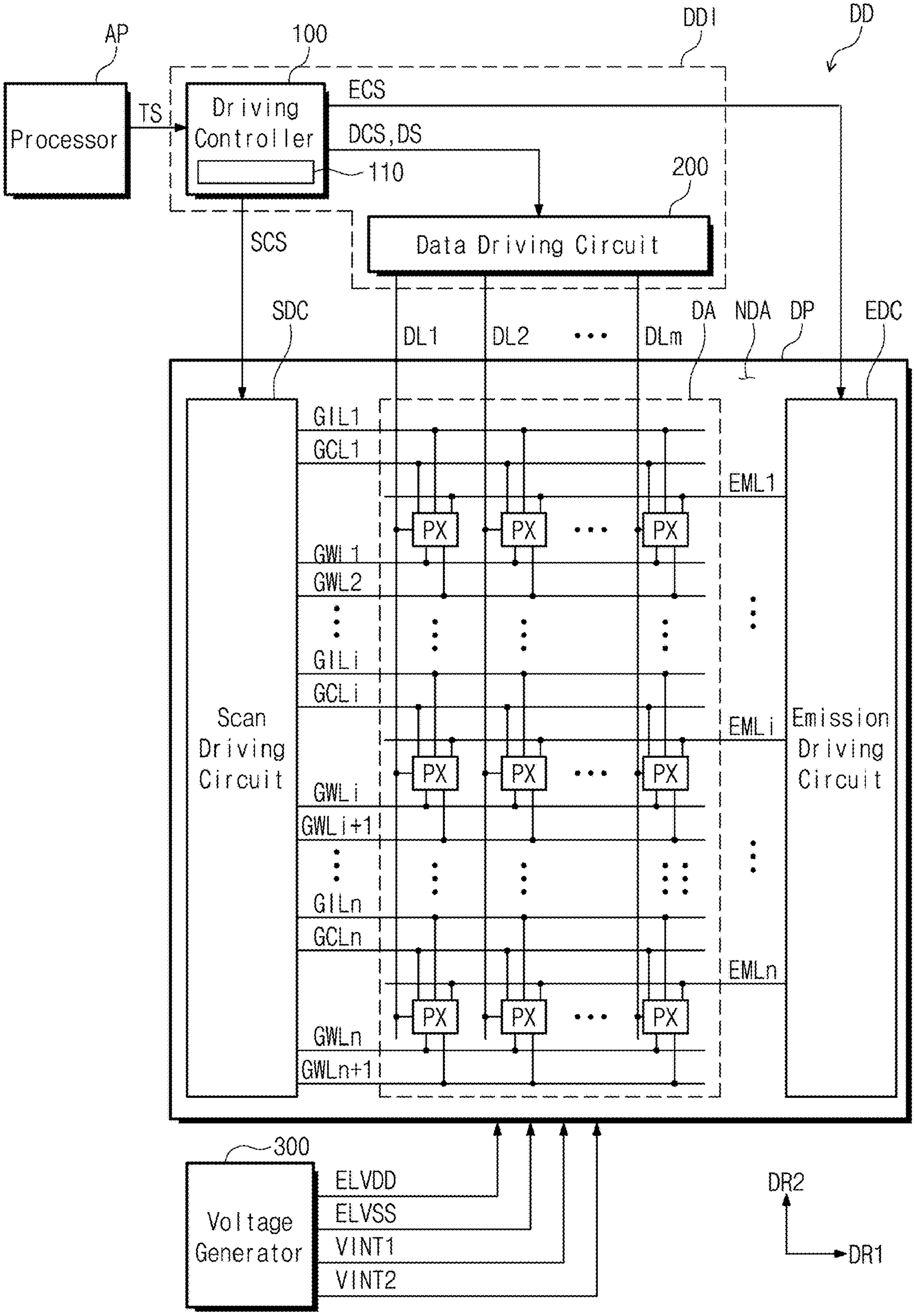
FIG. 5 is a block diagram of an embodiment of an electronic device according to the disclosure.

FIG. 5 is a block diagram of an embodiment of an electronic device according to the disclosure.

Referring to FIG. 5, the electronic device DD may include a processor AP, a driving circuit DDI, a display panel DP, and a voltage generator 300.

The processor AP may be one of an application processor, a graphics processor, a main processor, or a central processing unit ("CPU"). The driving circuit DDI may include a driving controller 100 and a data driving circuit 200. In an embodiment, the driving controller 100 and the data driving circuit 200 may be implemented on a single chip, but the disclosure is not limited thereto.

The processor AP may provide a transmit signal TS to the driving controller 100.

The driving controller 100 may operate in response to the transmit signal TS from the processor AP. The driving controller 100 may convert an image signal included in the transmit signal TS into an image data signal DS and output the image data signal DS. The driving controller 100 outputs a scan control signal SCS, a data control signal DCS, and a light-emitting control signal ECS in response to a control signal included in the transmit signal TS.

In an embodiment, the driving controller 100 may include a memory 110. The driving controller 100 may store the image signal included in the transmit signal TS in the memory 110.

The data driving circuit 200 receives the data control signal DCS and the image data signal DS from the driving controller 100. The data driving circuit 200 converts the image data signal DS into data signals and then outputs the data signals to a plurality of data lines DL1 to DLm (m is a natural number) to be described later.

The voltage generator 300 generates voltages desired in the operation of the display panel DP. In an embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, emission control lines EML1 to EMLn, the data lines DL1 to DLm, and pixels PX. The display panel DP may further include a scan driving circuit SDC and an emission driving circuit EDC. In an embodiment, the scan driving circuit SDC is disposed on a first side of the display panel DP. The scan lines GIL1 to GILn, GCL1 to GCLn, and GWL1 to GWLn+1 extend from the scan driving circuit SDC in the first direction DR1.

The emission driving circuit EDC is disposed on a second side of the display panel DP. The emission control lines EML1 to EMLn extend from the emission driving circuit EDC in a direction facing away from the first direction DR1.

The scan lines GIL1 to GILn, GCL1 to GCLn, and GWL1 to GWLn+1 and the emission control lines EML1 to EMLn are arranged to be spaced from each other in the second direction DR2. The data lines DL1 to DLm extend from the data driving circuit 200 in a direction facing away from the second direction DR2 and are arranged to be spaced from each other in the first direction DR1.

In an example illustrated in FIG. 5, the scan driving circuit SDC and the emission driving circuit EDC are arranged to face each other, with the pixels PX interposed therebetween. However, the disclosure is not limited thereto. In an embodiment, the scan driving circuit SDC and the emission driving circuit EDC may be next (adjacent) to each other in the non-display area NDA of the display panel DP, for example. In an embodiment, the scan driving circuit SDC and the emission driving circuit EDC may be implemented with one circuit.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. In an embodiment, as shown in FIG. 5, pixels in a first row may be connected to the scan lines GIL1, GCL1, GWL1, and GWL2 and the light-emitting control line EML1, for example. The pixels PX belonging to the i-th row may be connected to the scan lines GILi (i is a natural number equal to or less than n), GCLi, GWLi, and GWLi+1 and the emission control line EMLi. The pixels PX belonging to the n-th row may be connected to the scan lines GILn, GCLn, GWLn, and GWLn+1 and the emission control line EMLn.

Each of the plurality of pixels PX includes a light-emitting element ED (refer to FIG. 6) and a pixel circuit PXC (refer to FIG. 6) for controlling the emission of the light-emitting element ED. The pixel circuit PXC may include one or more transistors and one or more capacitors. The scan driving circuit SDC and the emission driving circuit EDC may include transistors formed through the same process as the pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SDC receives the scan control signal SCS from the driving controller 100. The scan driving circuit SDC may output scan signals to the scan lines GIL1 to GILn, GCL1 to GCLn, and GWL1 to GWLn+1 in response to the scan control signal SCS.

The driving controller 100, in an embodiment, may determine an operation mode based on information contained in the transmit signal TS. In an embodiment, the driving controller 100 may determine, as the operation mode, one of a single frequency mode and a multi-frequency mode based on the information contained in the transmit signal TS.

The driving controller 100 may divide the display panel DP into a plurality of display areas and drive the plurality of display areas at different driving frequencies when the determined operation mode is the multi-frequency mode.

An operation of the driving controller 100 will be more fully described below.

Figure 6:
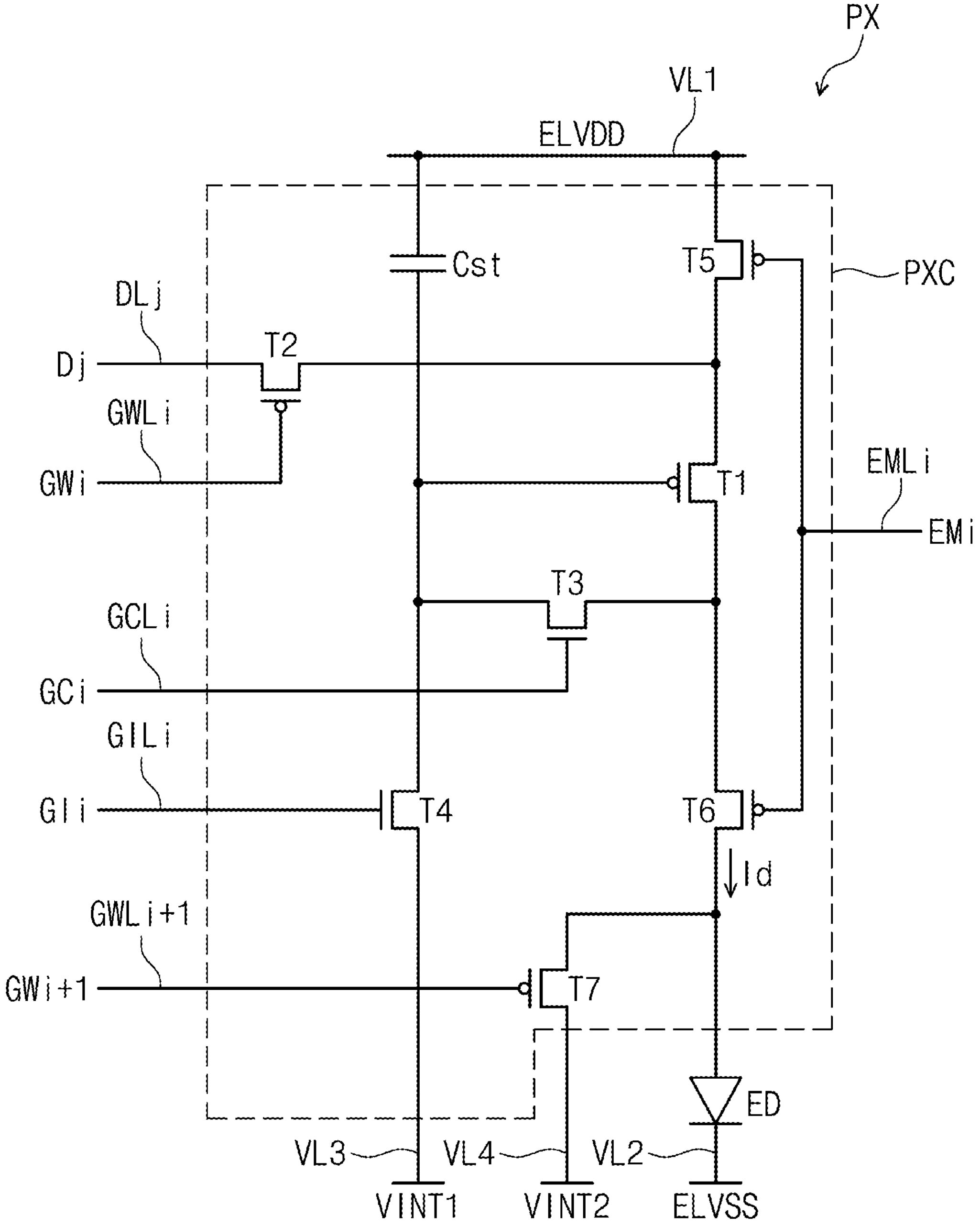
FIG. 6 is a circuit diagram of an embodiment of a pixel according to the disclosure.

FIG. 6 is a circuit diagram of an embodiment of a pixel according to the disclosure.

FIG. 6 shows an equivalent circuit diagram of a pixel PX connected to the j-th data line DLj (j is a natural number equal to or less than m) among the data lines DL1 to DLm, the i-th scan lines GILi, GCLi, and GWLi among the scan lines GIL1 to GILn, GCL1 to GCLn, and GWL1 to GWLn+1, the i+1th scan line GWLi+1, and the i-th emission control line EMLi among the emission control lines EML1 to EMLn, which are shown in FIG. 5.

Each of the pixels PX illustrated in FIG. 5 may have the same circuit configuration as the pixel PX illustrated in FIG. 6.

Referring to FIG. 6, the pixel PX of an electronic device in an embodiment may include the pixel circuit PXC and at least one light-emitting element ED. In an embodiment, the light-emitting element ED may be a light-emitting diode. In an embodiment, it is described that the one pixel PX may include one light-emitting element ED. The pixel circuit PXC includes first to seventh transistors T1, T2, T3, T4, T5, T6, and T7 and a capacitor Cst.

In an embodiment, the third and fourth transistors T3 and T4 among the first to seventh transistors T1 to T7 are N-type transistors that use an oxide semiconductor as a semiconductor layer, and each of the first, second, fifth, sixth, and seventh transistors T1, T2, T5, T6, and T7 is a P-type transistor having a low-temperature polycrystalline silicon ("LTPS") semiconductor layer. However, the disclosure is not limited thereto. In an embodiment, all the first to seventh transistors T1 to T7 may be P-type transistors or N-type transistors, for example. In an embodiment, at least one of the first to seventh transistors T1 to T7 may be an N-type transistor, and the remaining transistors may be P-type transistors. Also, a circuit configuration of a pixel in an embodiment of the disclosure is not limited to FIG. 6. The configuration of the pixel circuit PXC shown in FIG. 6 may be modified and implemented.

The scan lines GILi, GCLi, GWLi, and GWLi+1 may respectively transfer scan signals GIi, GCi, GWi, and GWi+1, and the emission line EMLi may transfer an emission control signal EMi. The data line DLj transfers a data signal Dj. First to fourth driving voltage lines VL1, VL2, VL3, and VL4 may respectively transfer the first driving voltage ELVDD, the second driving voltage ELVSS, the first initialization voltage VINT1, and the second initialization voltage VINT2.

The first transistor T1 includes a first electrode connected to the first driving voltage line VL1 through the fifth transistor T5, a second electrode electrically connected to an anode of the light-emitting element ED through the sixth transistor T6, and a gate electrode connected to a first end of the capacitor Cst. The first transistor T1 may receive the data signal Dj transferred through the data line DLj depending on a switching operation of the second transistor T2 and may supply a driving current Id to the light-emitting element ED.

The second transistor T2 includes a first electrode connected to the data line DLj, a second electrode connected to the first electrode of the first transistor T1, and a gate electrode connected to the scan line GWLi. The second transistor T2 may be turned on depending on the scan signal GWi transferred through the scan line GWLi and may transfer the data signal Dj from the data line DLj to the first electrode of the first transistor T1.

The third transistor T3 includes a first electrode connected to the gate electrode of the first transistor T1, a second electrode connected to the second electrode of the first transistor T1, and a gate electrode connected to the scan line GCLi. The third transistor T3 may be turned on depending on the scan signal GCi transferred through the scan line GCLi, and thus, the gate electrode and the second electrode of the first transistor T1 may be connected to each other, that is, the first transistor T1 may be diode-connected.

The fourth transistor T4 includes a first electrode connected to the gate electrode of the first transistor T1, a second electrode connected to the third driving voltage line VL3 through which the first initialization voltage VINT1 is transferred, and a gate electrode connected to the scan line GILi. The fourth transistor T4 may be turned on depending on the scan signal GIi transferred through the scan line GILi, and thus, the first initialization voltage VINT1 may be transferred to the gate electrode of the first transistor T1. As such, a voltage of the gate electrode of the first transistor T1 may be initialized. This operation may be also referred to as an "initialization operation".

The fifth transistor T5 includes a first electrode connected to the first driving voltage line VL1, a second electrode connected to the first electrode of the first transistor T1, and a gate electrode connected to the emission control line EMLi.

The sixth transistor T6 includes a first electrode connected to the second electrode of the first transistor T1, a second electrode connected to the anode of the light-emitting element ED, and a gate electrode connected to the emission control line EMLi.

The fifth transistor T5 and the sixth transistor T6 may be simultaneously turned on depending on the emission control signal EMi transferred through the emission control line EMLi, and thus, the first driving voltage ELVDD may be compensated for through the diode-connected first transistor T1 so as to be supplied to the light-emitting element ED.

The seventh transistor T7 includes a first electrode connected with the second electrode of the sixth transistor T6, a second electrode connected with the fourth driving voltage line VL4, and a gate electrode connected with the scan line GWLi+1. The seventh transistor T7 is turned on depending on the scan signal GWi+1 transferred through the scan line GWLi+1 and bypasses a current of the anode of the light-emitting element ED to the fourth driving voltage line VL4.

The first end of the capacitor Cst is connected to the gate electrode of the first transistor T1 as described above, and a second end of the capacitor Cst is connected to the first driving voltage line VL1. A cathode of the light-emitting element ED may be connected to the second driving voltage line VL2 transferring the second driving voltage ELVSS. The structure of the pixel PX in an embodiment is not limited to the structure illustrated in FIG. 6. In an embodiment, in one pixel PX, the number of transistors, the number of capacitors, and the connection relationship thereof may be variously changed or modified, for example.

Figure 7:
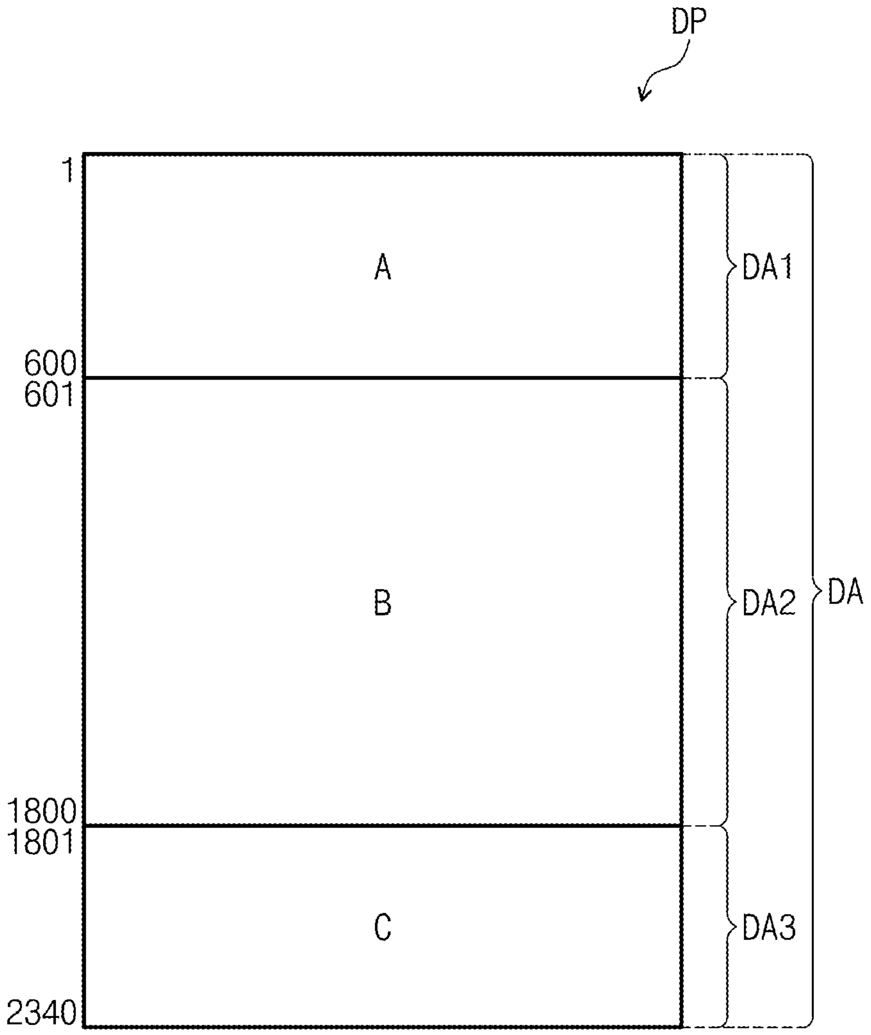
FIG. 7 is a diagram illustrating an embodiment of a display panel of an electronic device operating in a multi-frequency mode.

FIG. 7 is a diagram illustrating an embodiment of the display panel DP of the electronic device DD, which operates in a multi-frequency mode.

Referring to FIGS. 5 and 7, in a multi-frequency mode, the display area DA of the display panel DP may be divided into the first display area DA1, the second display area DA2, and the third display area DA3. The transmit signal TS provided from the processor AP to the driving controller 100 may include a first image signal A corresponding to the first display area DA1, a second image signal B corresponding to the second display area DA2, and a third image signal C corresponding to the third display area DA3.

In an embodiment, the first display area DA1 may include a first horizontal line to a 600-th horizontal line, the second display area DA2 may include a 601-st horizontal line to an 1800-th horizontal line, and the third display area DA3 may include an 1801-st horizontal line to a 2340-th horizontal line. The number of display areas included in the display panel DP shown in FIG. 7 and the size of each of the display areas are only examples, and the disclosure is not limited thereto.

Figure 8:
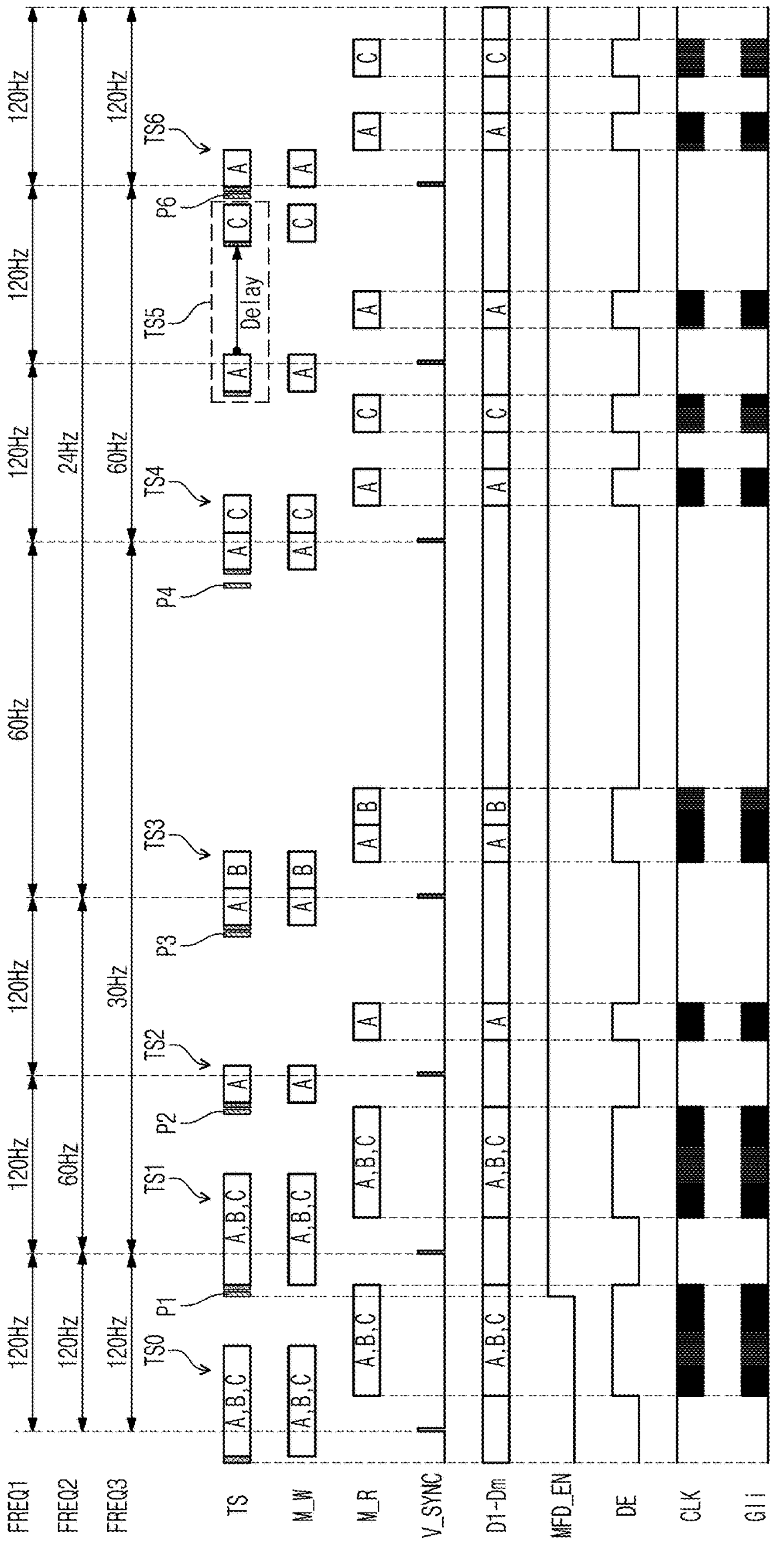
FIG. 8 is a diagram for describing an embodiment of an operation of an electronic device, according to the disclosure.

FIG. 8 is a diagram for describing an embodiment of an operation of the electronic device DD according to the disclosure.

Referring to FIGS. 5, 7, and 8, the display panel DP of the electronic device DD may include the first display area DA1, the second display area DA2, and the third display area DA3. The first display area DA1, second display area DA2, and third display area DA3 of the display panel DP may be driven at a first operating frequency FREQ1, a second operating frequency FREQ2, and a third operating frequency FREQ3, respectively.

The transmit signal TS may include 0-th to 6-th transmit signals TS0, TS1, TS2, TS3, TS4, TS5, and TS6. The 0-th to 6-th transmit signals TS0, TS1, TS2, TS3, TS4, TS5, and TS6 may be signals transmitted from the processor AP to the driving controller 100 at different time points.

Each of the 0-th to 6-th transmit signals TS0, TS1, TS2, TS3, TS4, TS5, and TS6 may include a parameter and an image signal. Each of the 0-th to 6-th transmit signals TS0, TS1, TS2, TS3, TS4, TS5, and TS6 may include both a parameter and an image signal, or may include an image signal other than a parameter.

In the example shown in FIG. 8, the 0-th transmit signal TS0 may include the first, second, and third image signals A, B, and C. The first transmit signal TS1 may include a first parameter P1 and the first, second, and third image signals A, B, and C. The second transmit signal TS2 may include a second parameter P2 and the first image signal A. The third transmit signal TS3 may include a third parameter P3 and the first and second image signals A and B. The fourth transmit signal TS4 may include a fourth parameter P4 and the first and third image signals A and C. The fifth transmit signal TS5 may include the first and third image signals A and C. The sixth transmit signal TS6 may include a sixth parameter P6 and the first image signal A.

Each of the first, second, third, fourth, and sixth parameters P1, P2, P3, P4, and P6 may include a plurality of commands (or a display command set). In an embodiment, the plurality of commands may include multi-frequency mode information, the number of display areas, whether an image signal is transmitted for each display area, and information about the last horizontal line of each display area, for example.

The processor AP may transmit the transmit signal TS to the driving controller 100 in the driving circuit DD1 when an update to the first, second, and third image signals A, B, and C is desired.

The 0-th transmit signal TS0 may include the first, second, and third image signals A, B, and C. That is, the 0-th transmit signal TS0 may not include a parameter.

While the electronic device DD operates in the single frequency mode, the first operating frequency FREQ1 of the first display area DA1, the second operating frequency FREQ2 of the second display area DA2, and the third operating frequency FREQ3 of the third display area DA3 may be all 120 Hz.

The driving controller 100 may store the first, second, and third image signals A, B, and C included in the 0-th transmit signal TS0 in the memory 110 in the single frequency mode. That is, write signals M_W stored in the memory 110 may be the first, second, and third image signals A, B, and C corresponding to the first display area DA1, the second display area DA2, and the third display area DA3.

The driving controller 100 may generate a vertical synchronization signal V_SYNC, a data enable signal DE, and a clock signal CLK in response to a parameter in the transmit signal TS.

The driving controller 100 may generate the clock signal CLK in synchronization with the vertical synchronization signal V_SYNC. The driving controller 100 may provide the clock signal CLK to the scan driving circuit SDC. The scan control signal SCS provided from the driving controller 100 to the scan driving circuit SDC may include the clock signal CLK.

The scan driving circuit SDC may generate the scan signal GIi in response to the clock signal CLK. The scan signal GIi may be provided to the pixel PX shown in FIG. 6.

The driving controller 100 may read an image signal from the memory 110 in response to the data enable signal DE and transmit the image signal to the data driving circuit 200. Read signals M_R read by the driving controller 100 from the memory 110 may be the first, second, and third image signals A, B, and C corresponding to the first, second, and third display areas DA1, DA2, and DA3. The operation mode of the electronic device DD may be switched from the single frequency mode to the multi-frequency mode. It may be assumed that the first operating frequency FREQ1 of the first display area DA1 is changed to 120 Hz, the second operating frequency FREQ2 of the second display area DA2 is changed to 60 Hz, and the third operating frequency FREQ3 of the third display area DA3 is changed to 30 Hz.

The first transmit signal TS1 may include the first parameter P1 and the first, second, and third image signals A, B, and C.

The first parameter P1 may include information in Table 1 below.

TABLE 1

| First parameter | Value |
|---|---|
| Enter_MFD | 1 |
| Row_Num[1:0] | 10 |
| Row_State[2:0] | 111 |
| Row_Boundary1[15:0] | Don't care |
| Row_Boundary2[15:0] | Don't care |

A first command Enter_MFD may represent multi-frequency mode information and may be 1 bit. When the first command Enter_MFD of the first parameter P1 is '1', the driving controller 100 may change the operation mode to the multi-frequency mode. In the multi-frequency mode, the driving controller 100 may set a multi-frequency enable signal MFD_EN to an active level (e.g., relatively high level).

A second command Row_Num[1:0] may represent the number of display areas. The second command Row_Num[1:0] of '00' may indicate that the entirety of the display panel DP is one display area. The second command Row_Num[1:0] of '01' may indicate that the entirety of the display panel DP is divided into two display areas. The second command Row_Num[1:0] of '10' may indicate that the display panel DP is divided into three display areas.

In the illustrated embodiment, the second command Row_Num[1:0] is 2 bits, but the disclosure is not limited thereto. In the multi-frequency mode, the number of bits of the second command Row_Num[1:0] may vary depending on the number of display areas into which the display panel DP is able to be divided.

A third command Row_State[2:0] may indicate whether an image signal is transmitted for each display area. When the second command Row_Num[1:0] is '010' and the third command Row_State[2:0] is '111', the image signals A, B, and C respectively corresponding to the first, second, and third display areas DA1, DA2, and DA3 are transmitted (or updated). That is, the transmit signal TS may include the image signals A, B, and C.

In the illustrated embodiment, the third command Row_State[2:0] is 2 bits, but the disclosure is not limited thereto. In the multi-frequency mode, the number of bits of the third command Row_State[2:0] may vary depending on the number of display areas into which the display panel DP is able to be divided.

A fourth command Row_Boundary1[15:0] may indicate the last horizontal line of the first display area DA1.

A fifth command (Row_Boundary2[15:0]) may indicate the last horizontal line of the second display area DA2.

Even when the operation mode is changed from the single frequency mode to the multi-frequency mode, the image signals A, B, and C respectively corresponding to the first, second, and third display areas DA1, DA2, and DA3 may need to be transmitted (or updated) in the first frame of the multi-frequency mode. Therefore, no matter what value the fourth command Row_Boundary1[15:0] and the fifth command Row_Boundary2[15:0] are set to at the first time, the driving controller 100 may ignore the set value.

In the illustrated embodiment, the second command Row_Num[1:0] is '10', that is, the display panel DP is divided into three display areas DA1, DA2, and DA3, and therefore, the first parameter P1 may include the fourth command Row_Boundary1[15:0] and the fifth command Row_Boundary2[15:0]. When the display panel DP is divided into four display areas, the first parameter P1 may further include a command indicating the last horizontal line of the third display area DA3.

The driving controller 100 may store the first, second, and third image signals A, B, and C included in the first transmit signal TS1 in the memory 110. That is, the write signals M_W stored in the memory 110 may be the first, second, and third image signals A, B, and C corresponding to the first, second, and third display areas DA1, DA2, and DA3.

The driving controller 100 may read the image signal from the memory 110 and transmit the image data signal DS to the data driving circuit 200. The read signals M_R read by the driving controller 100 from the memory 110 may be the first, second, and third image signals A, B, and C respectively corresponding to the first, second, and third display areas DA1, DA2, and DA3.

The second transmit signal TS2 may include the second parameter P2 and the first image signal A.

The second parameter P2 may include information in Table 2 below.

TABLE 2

| Second parameter | Value |
|---|---|
| Enter_MFD | 1 |
| Row_Num[1:0] | 10 |
| Row_State[2:0] | 001 |
| Row_Boundary1[15:0] | 0000 0010 0101 1000 (=600) |
| Row_Boundary2[15:0] | Don't care |

The first command Enter_MFD and second command Row_Num[1:0] of the second parameter P2 are the same as the first command Enter_MFD and second command Row_Num[1:0] of the first parameter P1, so redundant descriptions are omitted.

When the third command Row_State[2:0] is '001', the first image signal A corresponding to the first display area DA1 may be transmitted (or updated). That is, the second transmit signal TS2 may include the first image signal A.

The fourth command Row_Boundary1[15:0] may indicate the last horizontal line of the first display area DA1. In an embodiment, when the fourth command Row_Boundary1[15:0] is '0000 0010 0101 1000', the last horizontal line of the first display area DA1 may be the 600-th horizontal line, for example.

In the illustrated embodiment, because the second transmit signal TS2 includes only the image signal A corresponding to the first display area DA1, no matter what value the fifth command Row_Boundary2[15:0] is set to, the driving controller 100 may ignore the set value.

The driving controller 100 may store the first image signal A included in the second transmit signal TS2 in the memory 110. That is, the write signal M_W stored in the memory 110 may be the first image signal A corresponding to the first display area DA1.

The driving controller 100 may read an image signal from the memory 110 and transfer the image signal to the data driving circuit 200. The read signal M_R read by the driving controller 100 from the memory 110 may be the first image signal A corresponding to the first display area DA1.

Because the last horizontal line of the first display area DA1 is the 600-th horizontal line, the driving controller 100 may deactivate the data enable signal DE and the clock signal CLK from the 601-st horizontal line. In other words, the driving controller 100 may maintain the data enable signal DE and the clock signal CLK to be disabled for the time duration corresponding to the second display area DA2 and the third display area DA3.

The third transmit signal TS3 may include the third parameter P3 and the first and second image signals A and B.

The third parameter P3 may include information in Table 3 below.

TABLE 3

| Third parameter | Value |
|---|---|
| Enter_MFD | 1 |
| Row_Num[1:0] | 10 |
| Row_State[2:0] | 011 |
| Row_Boundary1[15:0] | Don't care |
| Row_Boundary2[15:0] | 0000 0111 0000 1000 (=1800) |

The first command Enter_MFD and second command Row_Num[1:0] of the third parameter P3 are the same as the first command Enter_MFD and second command Row_Num[1:0] of the first parameter P1, so redundant descriptions are omitted.

When the third command Row_State[2:0] is '011', the first image signal A corresponding to the first display area DA1 and the second image signal B corresponding to the second display area DA2 are transmitted (or updated). That is, the third transmit signal TS3 includes the first image signal A and the second image signal B.

The fourth command Row_Boundary1[15:0] may indicate the last horizontal line of the first display area DA1.

The fifth command Row_Boundary2[15:0] may indicate the last horizontal line of the second display area DA2. In an embodiment, when the fifth command Row_Boundary2[15:

0] is '0000 0111 0000 1000', the last horizontal line of the second display area DA2 is an 1800-th horizontal line, for example.

The driving controller 100 may store the first and second image signals A and B included in the third transmit signal TS3 in the memory 110. That is, the write signals M_W stored in the memory 110 are the first and second image signals A and B respectively corresponding to the first and second display areas DA1 and DA2.

The driving controller 100 may read an image signal from the memory 110 and transfer the image signal to the data driving circuit 200. The read signals M_R read by the driving controller 100 from the memory 110 are the first and second image signals A and B respectively corresponding to the first and second display areas DA1 and DA2.

Because the last horizontal line of the second display area DA2 is the 1800-th horizontal line, the driving controller 100 may deactivate the data enable signal DE and the clock signal CLK from the 1801-st horizontal line.

The fourth transmit signal TS4 may include the fourth parameter P4 and the first and third image signals A and C.

The fourth parameter P4 may include information in Table 4 below.

TABLE 4

| Fourth parameter | Value |
|---|---|
| Enter_MFD | 1 |
| Row_Num[1:0] | 10 |
| Row_State[2:0] | 101 |
| Row_Boundary1[15:0] | 0000 0010 0101 1000 (=600) |
| Row_Boundary2[15:0] | 0000 0111 0000 1000 (=1800) |

The first command Enter_MFD and second command Row_Num[1:0] of the fourth parameter P4 are the same as the first command Enter_MFD and second command Row_Num[1:0] of the first parameter P1, so redundant descriptions are omitted.

When the third command Row_State[2:0] is '101', the first image signal A corresponding to the first display area DA1 and the third image signal C corresponding to the third display area DA3 are transmitted (or updated). That is, a fourth image of the fourth transmit signal TS4 may include the first image signal A and the third image signal C.

The fourth command Row_Boundary1[15:0] may indicate the last horizontal line of the first display area DA1. In an embodiment, when the fourth command Row_Boundary1 [15:0] is '0000 0010 0101 1000', the last horizontal line of the first display area DA1 is the 600-th horizontal line, for example.

The fifth command Row_Boundary2[15:0] may indicate the last horizontal line of the second display area DA2. In an embodiment, when the fifth command Row_Boundary2[15:0] is '0000 0111 0000 1000', the last horizontal line of the second display area DA2 is the 1800-th horizontal line, for example.

The driving controller 100 may store the first and third image signals A and C included in the fourth transmit signal TS4 in the memory 110. That is, the write signals M_W stored in the memory 110 are the first and third image signals A and C corresponding to the first and third display areas DA1 and DA3.

The driving controller 100 may read the image signals from the memory 110 and transfer image signals to the data driving circuit 200. The read signals M_R read by the driving controller 100 from the memory 110 may be the first and third image signals A and C corresponding to the first and third display areas DA1 and DA3.

Because the last horizontal line of the first display area DA1 is the 600-th horizontal line, the driving controller 100 may deactivate the data enable signal DE and the clock signal CLK starting from the 601-st horizontal line.

Because the last horizontal line of the second display area DA2 is the 1800-th horizontal line, the driving controller 100 may activate the data enable signal DE and the clock signal CLK starting from the 1801-st horizontal line. Therefore, an image corresponding to the third image signal C may be displayed in the third display area DA3.

The fifth transmit signal TS5 may include the first and third image signals A and C.

The processor AP may not include the parameter in the transmit signal TS when there is no change in the parameter (or when a change in the parameter is not desired).

Because a parameter to be included in the fifth transmit signal TS5 is the same as the fourth parameter P4 of the previous fourth transmit signal TS4, the fifth transmit signal TS5 does not include the parameter.

For various reasons, the third image signal C corresponding to the third display area DA3 may be received after a predetermined time delay after the first image signal A corresponding to the first display area DA1 is received. The write signals M_W stored in the memory 110 may be the first image signal A corresponding to the first display area DA1 and the third image signal C corresponding to the third display area DA3.

The driving controller 100 may read the image signals from the memory 110 and transfer image signals to the data driving circuit 200. The read signal M_R, read by the driving controller 100 from the memory 110 may be the first image signal A corresponding to the first display area DA1.

In the example shown in FIG. 8, the time point when the driving controller 100 stores (or updates) the third image signal C corresponding to the third display area DA3 in the memory 110 is later than the time point when the driving controller 100 reads the third image signal C corresponding to the third display area DA3 from the memory 110. Therefore, the read signal M_R read by the driving controller 100 from the memory 110 includes only the first image signal A corresponding to the first display area DA1.

Because the last horizontal line of the first display area DA1 is the 600-th horizontal line, the driving controller 100 may deactivate the data enable signal DE and the clock signal CLK from the 601-st horizontal line.

The sixth transmit signal TS6 may include the sixth parameter P6 and the first image signal A.

The sixth parameter P6 may include information in Table 5 below.

TABLE 5

| Sixth parameter | Value |
|---|---|
| Enter MFD | 1 |
| Row_Num[1:0] | 10 |
| Row_State[2:0] | 001 |
| Row_Boundary1[15:0] | 0000 0010 0101 1000 (=600) |
| Row_Boundary2[15:0] | Don't care |

The first command Enter_MFD and second command Row_Num[1:0] of the sixth parameter P6 are the same as the first command Enter_MFD and second command Row_Num[1:0] of the first parameter P1, so redundant descriptions are omitted.

When the third command Row_State[2:0] is '001', the first image signal A corresponding to the first display area DA1 may be transmitted (or updated). That is, a sixth image of the sixth transmit signal TS6 may include the first image signal A.

The fourth command Row_Boundary1[15:0] may indicate the last horizontal line of the first display area DA1. In an embodiment, when the fourth command Row_Boundary1 [15:0] is '0000 0010 0101 1000', the last horizontal line of the first display area DA1 may be the 600-th horizontal line, for example.

The fifth command Row_Boundary2[15:0] may indicate the last horizontal line of the second display area DA2.

The driving controller 100 may store the first image signal A included in the sixth transmit signal TS6 in the memory 110. That is, the write signal M_W stored in the memory 110 may be the first image signal A corresponding to the first display area DA1.

The driving controller 100 may read an image signal from the memory 110 and transfer the image signal to the data driving circuit 200. The read signals M_R read by the driving controller 100 from the memory 110 may be the first and third image signals A and C corresponding to the first and third display areas DA1 and DA3.

The first image signal A corresponding to the first display area DA1 may be an image signal included in the sixth transmit signal TS6, and the third image signal C corresponding to the third display area DA3 may be an image signal included in the previous fifth transmit signal TS5.

By transmitting the transmit signal TS as shown in FIG. 8 to the driving controller 100 in the processor AP, the first operating frequency FREQ1 of the first display area DA1 of the electronic device DD may be sequentially 120 Hz, 120 Hz, 120 Hz, 60 Hz, 120 Hz, 120 Hz, 120 Hz, and 120 Hz. The second operating frequency FREQ2 of the second display area DA2 of the electronic device DD may be 120 Hz, 60 Hz, and 24 Hz sequentially. The third operating frequency FREQ3 of the third display area DA3 of the electronic device DD may be 120 Hz, 30 Hz, 60 Hz, and 120 Hz sequentially.

At the time point of transmitting the fifth transmit signal TS5, the processor AP may be about to change the third operating frequency FREQ3 of the third display area DA3 of the display panel DP from 30 Hz to 120 Hz. That is, the third operating frequency FREQ3 of the third display area DA3 of the electronic device DD should be sequentially changed to 120 Hz, 30 Hz, 120 Hz, and 120 Hz. However, the third image signal C corresponding to the third display area DA3 is delayed, and therefore, the third operating frequency FREQ3 of the third display area DA3 of the electronic device DD may be sequentially 120 Hz, 30 Hz, 60 Hz, and 120 Hz.

The processor AP may change the operating frequency of each of the plurality of areas of the display panel DP by transmitting the transmit signal TS to the driving circuit DD1.

Figure 9:
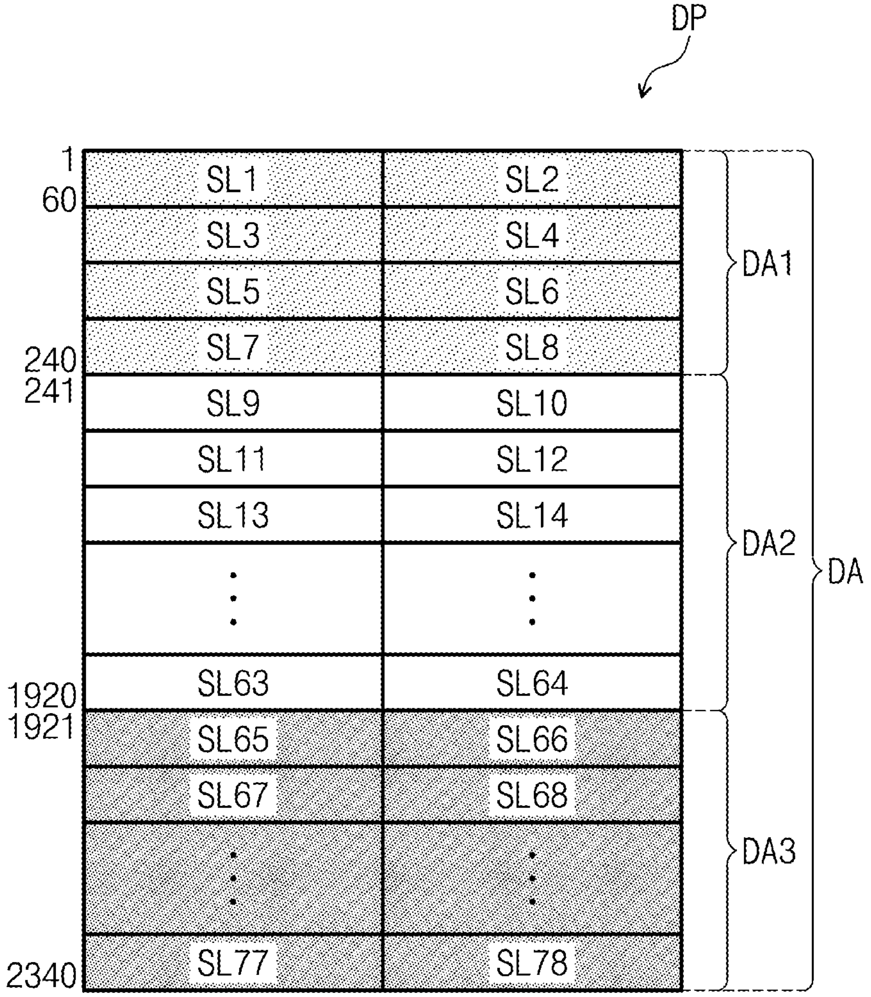
FIG. 9 is a diagram illustrating an embodiment of a display panel of an electronic device operating in a multi-frequency mode, which is divided into a plurality of slice areas.

FIG. 9 is a diagram illustrating an embodiment of the display panel DP of the electronic device DD operating in a multi-frequency mode, which is divided into a plurality of slice areas.

Figure 10:
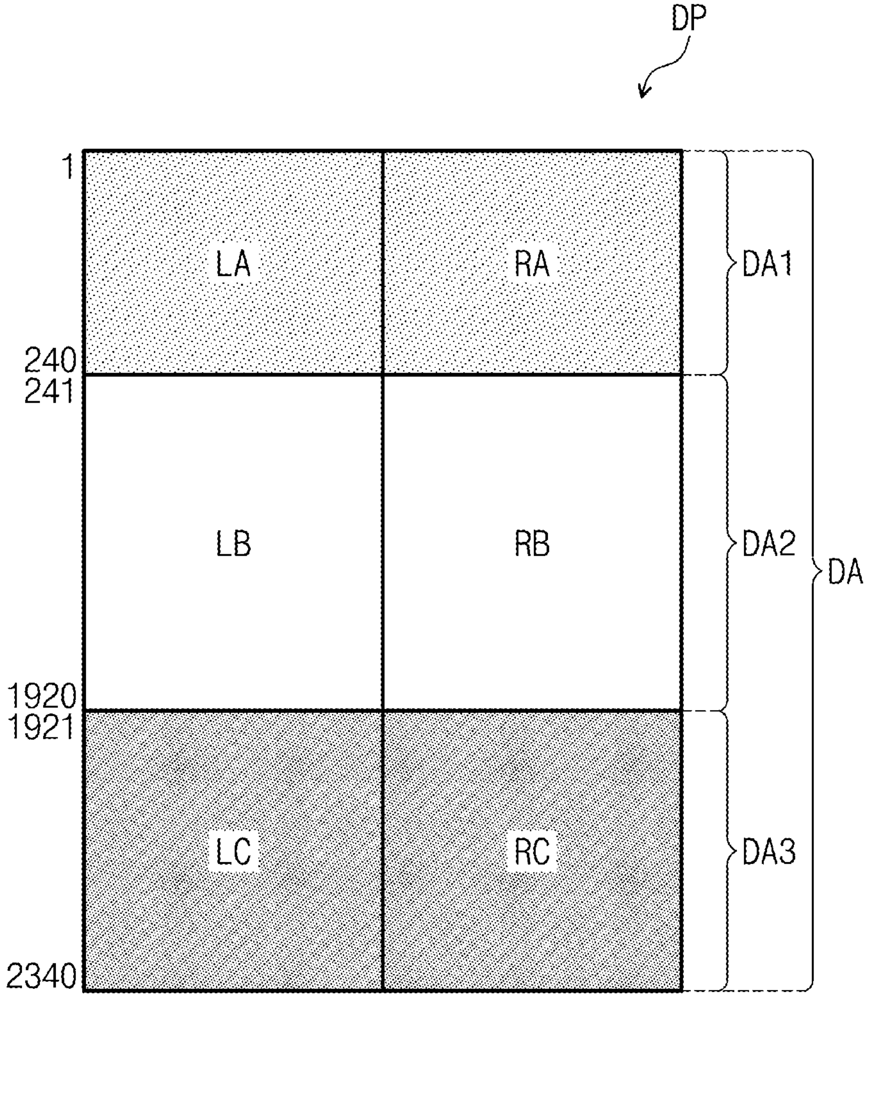
FIG. 10 is a diagram illustrating an embodiment of an image signal corresponding to a display panel of an electronic device operating in a multi-frequency mode.

FIG. 10 is a diagram illustrating an embodiment of an image signal corresponding to the display panel DP of the electronic device DD operating in a multi-frequency mode.

Referring to FIGS. 5, 9, and 10, in the multi-frequency mode, the display area DA of the display panel DP may be divided into the first display area DA1, the second display area DA2, and the third display area DA3.

In an embodiment, the first display area DA1 may include a 1st horizontal line to a 240-th horizontal line, the second display area DA2 may include a 241-st horizontal line to a 1920-th horizontal line, and the third display area DA3 may include a 1921-st horizontal line to a 2340-th horizontal line. The number of display areas included in the display panel DP shown in FIGS. 9 and 10 and the size of each of the display areas are only examples, and the disclosure is not limited thereto.

Each of the first display area DA1, the second display area DA2, and the third display area DA3 may include a plurality of slice areas. In an embodiment, the first display area DA1 may include first to eighth slice areas SL1 to SL8, the second display area DA2 may include ninth to 64-th slice areas SL9 to SL64, and the third display area DA3 may include 65-th to 78-th slice areas SL63 to SL78, for example.

The number of slice areas included in each of the first, second, and third display areas DA1, DA2, and DA3 of the display panel DP shown in FIG. 9 is only an illustrative embodiment, and the disclosure is not limited thereto.

Each of the first to 78-th slice areas SL1 to SL78 may correspond to 60 horizontal lines.

One horizontal line in the display panel DP may be included in two slice areas. In an embodiment, the first horizontal line may be included in the first and second slice areas SL1 and SL2, and the 241-st horizontal line may be included in the 9-th and 10-th slice areas SL9 and SL10, for example.

The transmit signal TS provided from the processor AP to the driving controller 100 may include a first left image signal LA, a first right image signal RA, a second left image signal LB, a second right image signal RB, a third left image signal LC, and a third right image signal RC.

The first left image signal LA may correspond to the odd-numbered slice areas SL1, SL3, SL5, and SL7 of the first display area DA1.

The first right image signal RA may correspond to the even-numbered slice areas SL2, SL4, SL6, and SL8 of the first display area DA1.

The second left image signal LB may correspond to the odd-numbered slice areas SL9, SL11, SL13, . . . , and SL63 of the second display area DA2.

The second right image signal RB may correspond to the even-numbered slice areas SL10, SL12, SL14, . . . , and SL64 of the second display area DA2.

The third left image signal LC may correspond to the odd-numbered slice areas SL65, SL67, . . . , and SL77 of the third display area DA3.

The third right image signal RC may correspond to the even-numbered slice areas SL66, SL68, . . . , and SL78 of the third display area DA3.

Figure 11:
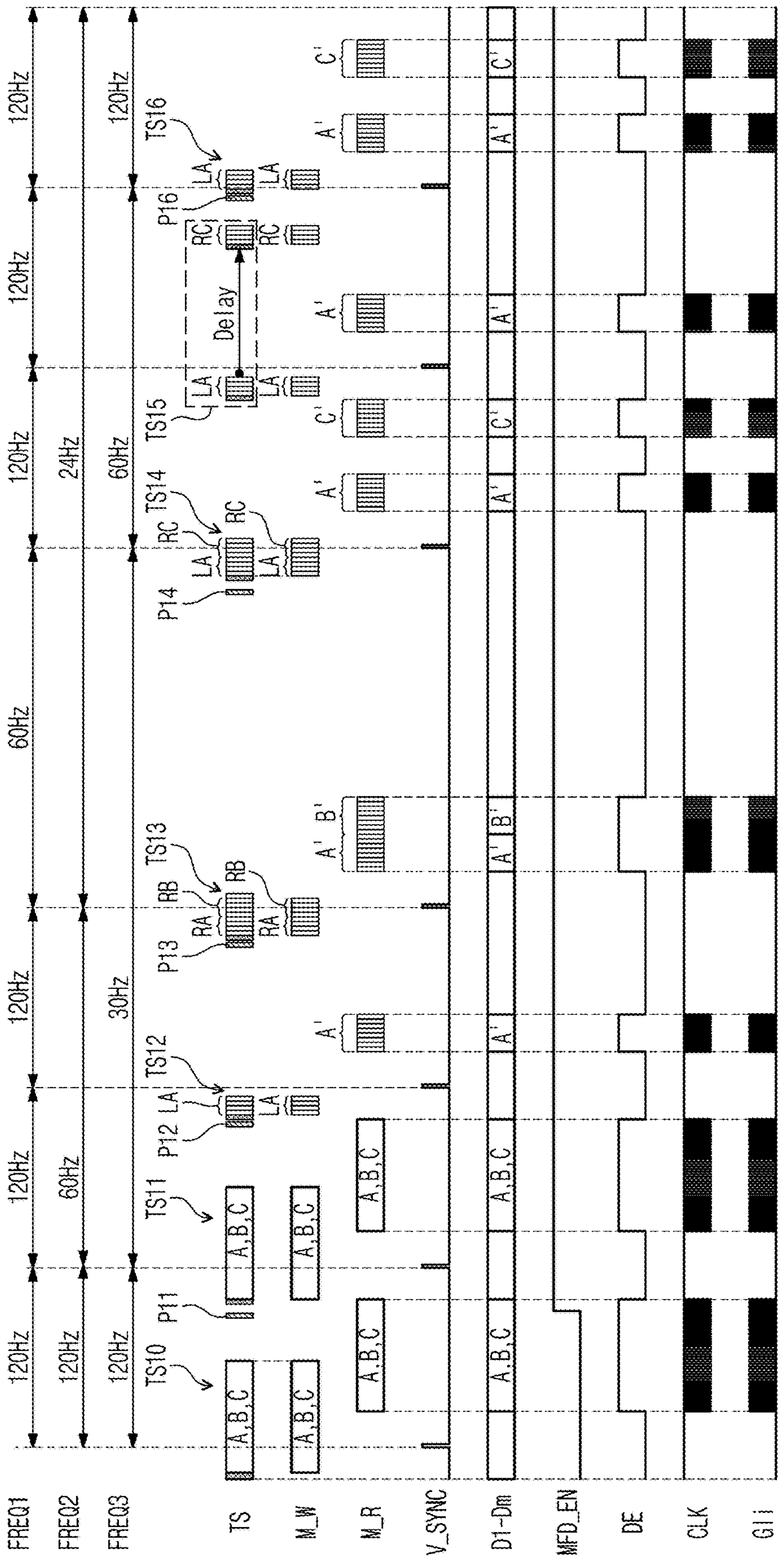
FIG. 11 is a diagram for describing an embodiment of an operation of an electronic device, according to the disclosure.

FIG. 11 is a diagram for describing an embodiment of an operation of the electronic device DD according to the disclosure.

Among the operations of the electronic device DD shown in FIG. 11, duplicate descriptions of the same operations as those of FIG. 8 will be omitted.

Referring to FIGS. 5, 9, 10, and 11, the display panel DP of the electronic device DD may include the first display area DA1, the second display area DA2, and the third display area DA3. The first display area DA1, second display area DA2, and third display area DA3 of the display panel DP may be driven at the first operating frequency FREQ1, the second operating frequency FREQ2, and the third operating frequency FREQ3, respectively.

The transmit signal TS may include 10-th to 16-th transmit signals TS10, TS11, TS12, TS13, TS14, TS15, and TS16. The 10-th to 16-th transmit signals TS10, TS11, TS12, TS13, TS14, TS15, and TS16 may be signals transmitted from the processor AP to the driving controller 100 at different time points.

Each of the 10-th to 16-th transmit signals TS10, TS11, TS12, TS13, TS14, TS15, and TS16 may include a parameter and an image signal. Each of the 10-th to 16-th transmit signals TS10, TS11, TS12, TS13, TS14, TS15, and TS16 may include both a parameter and an image signal, or may include only an image signal other than a parameter.

The 10-th transmit signal TS10 and the 11-th transmit signal TS11 shown in FIG. 11 are the same as the 0-th transmit signal TS0 and the first transmit signal TS1 shown in FIG. 8, so duplicate descriptions are omitted. The 12-th transmit signal TS12 may include a 12-th parameter P12 and the first left image signal LA. The 13-th transmit signal TS13 may include a 13-th parameter P13, the first right image signal RA, and the second right image signal RB. The 14-th transmit signal TS14 may include a 14-th parameter P14, the first left image signal LA, and the third right image signal RC. The 15-th transmit signal TS15 may include the first left image signal LA, and the third right image signal RC. The 16-th transmit signal TS16 may include a 16-th parameter P16 and the first left image signal LA.

Each of the 11-th, 12-th, 13-th, 14-th, and 16-th parameters P11, P12, P13, P14, and P16 may include a plurality of commands (or a display command set). In an embodiment, the plurality of commands may include multi-frequency mode information, the number of display areas, whether an image signal is transmitted for each display area, and information about the last horizontal line of each display area, for example.

The processor AP may transmit the transmit signal TS to the driving controller 100 in the driving circuit DD1 when the first, second, and third image signals A, B, and C is desired to be updated.

The 11-th transmit signal TS11 may include the 11-th parameter P11 and the first, second, and third image signals A, B, and C. The first image signal A may include the first left image signal LA and the first right image signal RA. The second image signal B may include the second left image signal LB and the second right image signal RB. The third image signal C may include the third left image signal LC and the third right image signal RC.

The 11-th parameter P11 may include information in Table 6 below.

TABLE 6

| 11-th parameter | Value |
|---|---|
| Enter_MFD | 1 |
| Row_Num[1:0] | 10 |
| Row_State[2:0] | 111 |
| Row_Boundary1[15:0] | Don't care |
| Row_Boundary2[15:0] | Don't care |
| C_Slice1[7:0] | Don't care |
| C_Slice2[7:0] | Don't care |
| C_Slice3[7:0] | Don't care |

The first command Enter_MFD may represent multi-frequency mode information and may be 1 bit. When the first command Enter_MFD is '1', the driving controller 100 may change the operation mode to the multi-frequency mode. In the multi-frequency mode, the driving controller 100 may set the multi-frequency enable signal MFD_EN to an active level (e.g., relatively high level).

The second command Row_Num[1:0] may indicate the number of display areas. The second command Row_Num[1:0] of '00' may indicate that the entirety of the display panel DP is one display area. The second command Row_Num[1:0] of '01' may indicate that the entirety of the display panel DP is divided into two display areas. The second command Row_Num[1:0] of '10' may indicate that the display panel DP is divided into three display areas.

In the illustrated embodiment, the second command Row_Num[1:0] is 2 bits, but the disclosure is not limited thereto. In the multi-frequency mode, the number of bits of the second command Row_Num[1:0] may vary depending on the number of display areas into which the display panel DP is able to be divided.

The third command Row_State[2:0] may indicate whether an image signal is transmitted for each display area. When the second command Row_Num[1:0] is '10' and the third command Row_State[2:0] is '111', the image signals A, B, and C respectively corresponding to the first, second, and third display areas DA1, DA2, and DA3 are transmitted (or updated). That is, the transmit signal TS may include the image signals A, B, and C.

In the illustrated embodiment, the third command Row_State[2:0] is 2 bits, but the disclosure is not limited thereto. In the multi-frequency mode, the number of bits of the third command Row_State[2:0] may vary depending on the number of display areas into which the display panel DP is able to be divided.

The fourth command Row_Boundary1[15:0] may indicate the last horizontal line of the first display area DA1.

The fifth command Row_Boundary2[15:0] may indicate the last horizontal line of the second display area DA2.

Even when the operation mode is changed from the single frequency mode to the multi-frequency mode, the image signals A, B, and C respectively corresponding to the first, second, and third display areas DA1, DA2, and DA3 may need to be transmitted (or updated) in the first frame of the multi-frequency mode. Therefore, no matter what value the fourth command Row_Boundary1[15:0] and the fifth command Row_Boundary2[15:0] are set to at the first time, the driving controller 100 may ignore the set value.

In the illustrated embodiment, the second command Row_Num[1:0] is '10', that is, the display panel DP is divided into three display areas DA1, DA2, and DA3, and therefore, the 11-th parameter P11 may include the fourth command Row_Boundary1[15:0] and the fifth command Row_Boundary2[15:0]. When the display panel DP is divided into four display areas, the 11-th parameter P11 may further include a command indicating the last horizontal line of the third display area DA3.

A sixth command C_Slice1[7:0] may indicate whether image signals corresponding to the slice areas of the first display area DA1 are updated.

A seventh command C_Slice2[7:0] may indicate whether image signals corresponding to the slice areas of the second display area DA2 are updated.

An eighth command C_Slice3[7:0] may indicate whether image signals corresponding to the slice areas of the third display area DA3 are updated.

In the example shown in FIG. 11, the third command Row_State[2:0] of the 11-th transmit signal TS11 is '111' (the image signals A, B, and C corresponding to the first, second, and third display areas DA1, DA2, and DA3 are transmitted (or updated)) and therefore, the driving controller 100 may ignore the values of the sixth command C_Slice1[7:0], the seventh command C_Slice2[7:0], and the eighth command C_Slice3[7:0].

The driving controller 100 may store the first, second, and third image signals A, B, and C included in the 11-th transmit signal TS11 in the memory 110. That is, the write signals M_W stored in the memory 110 may be the first, second, and third image signals A, B, and C corresponding to the first, second, and third display areas DA1, DA2, DA3.

The driving controller 100 may read an image signal from the memory 110 and transfer the image signal to the data driving circuit 200. The read signals M_R read by the driving controller 100 from the memory 110 may be the first, second, and third image signals A, B, and C respectively corresponding to the first, second, and third display areas DA1, DA2, and DA3.

The 12-th transmit signal TS12 may include the 12-th parameter P12 and the first left image signal LA.

The 12-th parameter P12 may include information in Table 7 below.

TABLE 7

| 12-th parameter | Value |
|---|---|
| Enter_MFD | 1 |
| Row_Num[1:0] | 10 |
| Row_State[2:0] | 001 |
| Row_Boundary1[15:0] | 0000 0000 1111 0000 (=240) |
| Row_Boundary2[15:0] | Don't care |
| C_Slice1[7:0] | 0101 0101 |
| C_Slice2[7:0] | Don't care |
| C_Slice3[7:0] | Don't care |

The first command Enter_MFD and second command Row_Num[1:0] of the 12-th parameter P12 are the same as the first command Enter_MFD and second command Row_Num[1:0] of the 11-th parameter P11, so redundant descriptions are omitted.

When the third command Row_State[2:0] is '001', the first left image signal LA corresponding to the first display area DA1 is transmitted (or updated).

The fourth command Row_Boundary1[15:0] may indicate the last horizontal line of the first display area DA1. In an embodiment, when the fourth command Row_Boundary1[15:0] is '0000 0000 1111 0000', the last horizontal line of the first display area DA1 is the 240-th horizontal line, for example.

In the illustrated embodiment, the 12-th transmit signal TS12 includes only the first left image signal LA corresponding to the first display area DA1, and therefore, no matter what value the fifth command Row_Boundary2[15:0] is set to, the driving controller 100 may ignore the set value.

The sixth command C_Slice1[7:0] may indicate whether image signals corresponding to the slice areas of the first display area DA1 are updated. The sixth command C_Slice1[7:0] of '0101 0101' indicates that the first left image signals LA corresponding to the odd-numbered slice areas SL1, SL3, SL5, and SL7 of the first display area DA1 are updated.

The seventh command C_Slice2[7:0] may indicate whether image signals corresponding to the slice areas of the second display area DA2 are updated.

The eighth command C_Slice3[7:0] indicates whether image signals corresponding to the slice areas of the third display area DA3 are updated.

In the example shown in FIG. 11, the third command Row_State[2:0] of the 11-th transmit signal TS11 is '001', and therefore, the driving controller 100 may ignore values of the seventh command C_Slice2[7:0] and the eighth command C_Slice3[7:0].

The driving controller 100 stores the first left image signals LA corresponding to the odd-numbered slice areas SL1, SL3, SL5, and SL7 of the first display area DA1 included in the 12-th transmit signal TS12 in the memory 110. That is, the write signals M_W stored in the memory 110 are the first left image signals LA.

The driving controller 100 may read an image signal from the memory 110 and transfer the image signal to the data driving circuit 200. The read signals M_R read by the driving controller 100 from the memory 110 are first image signals A' corresponding to the entirety of the first display area DA1. That is, the image signals A' may include the first left image signal LA which is currently updated (or belongs to a current frame) in the memory 110 and the first right image signal RA included in the 11-th transmit signal TS11, which is previously updated (or belongs to a previous frame). The reason for this is that the driving controller 100 reads signals stored in the memory 110 in horizontal line units.

The 13-th transmit signal TS13 may include the 13-th parameter P13, the first right image signal RA, and the second right image signal RB.

The 13-th parameter P13 may include information in Table 8 below.

TABLE 8

| 13-th parameter | Value |
|---|---|
| Enter_MFD | 1 |
| Row_Num[1:0] | 10 |
| Row_State[2:0] | 011 |
| Row_Boundary1[15:0] | Don't care |
| Row_Boundary2[15:0] | 0000 0111 1000 0000 (=1920) |
| C_Slice1[7:0] | 1010 1010 |
| C_Slice2[7:0] | 1010 1010 |
| C_Slice3[7:0] | Don't care |

The first command Enter_MFD and second command Row_Num[1:0] of the 13-th parameter P13 are the same as the first command Enter_MFD and second command Row_Num[1:0] of the 11-th parameter P11, so redundant descriptions are omitted.

When the third command Row_State[2:0] is '011', the first right image signal RA corresponding to the first display area DA1 and the second right image signal RB corresponding to the second display area DA2 are transmitted (or updated).

The fourth command Row_Boundary1[15:0] may indicate the last horizontal line of the first display area DA1.

The fifth command Row_Boundary2[15:0] may indicate the last horizontal line of the second display area DA2. In an embodiment, when the fifth command Row_Boundary2[15:0] is '0000 0111 1000 0000', the last horizontal line of the second display area DA2 is the 1920-th horizontal line, for example.

The sixth command C_Slice1[7:0] may indicate whether image signals corresponding to the slice areas of the first display area DA1 are updated. The sixth command C_Slice1[7:0] of '1010 1010' indicates that the even-numbered slice areas SL2, SL4, SL6, and SL8 of the first display area DA1 are updated.

The seventh command C_Slice2[7:0] may indicate whether image signals corresponding to the slice areas of the second display area DA2 are updated. The seventh command C_Slice2[7:0] of '1010 1010' indicates that the second right image signals RB corresponding to the even-numbered slice areas SL10, SL12, SL14, . . . , and SL64 of the second display area DA2 are updated.

The eighth command C_Slice3[7:0] indicates whether image signals corresponding to the slice areas of the third display area DA3 are updated.

The driving controller 100 stores, in the memory 110, the first right image signal RA corresponding to the even-numbered slice areas SL2, SL4, SL6, and SL8 of the first display area DA1 included in the 13-th transmit signal TS13 and the second right image signal RB corresponding to the even-numbered slice areas SL10, SL12, SL14, . . . , and SL64) of the second display area DA2. That is, the write signals M_W stored in the memory 110 are the first right image signal RA and the second right image signal RB.

The driving controller 100 may read an image signal from the memory 110 and transfer the image signal to the data driving circuit 200. In this case, the read signals M_R read by the driving controller 100 from the memory 110 includes image signals A' corresponding to the entirety of the first display area DA1 and image signals B' corresponding to the entirety of the second display area DA2. Here, the image signals A' includes the first left image signal LA which is currently updated (or belongs to a current frame) in the memory 110 and the first right image signal RA included in the 11-th transmit signal TS11, which is previously updated (or belongs to a previous frame). The image signals B' includes the second left image signal LB which is currently updated (or belongs to a current frame) in the memory 110 and the second right image signal RB included in the 11-th transmit signal TS11, which is previously updated (or belongs to a previous frame).

The 14-th transmit signal TS14 includes the 14-th parameter P14, the first left image signal LA, and a third left image signal LC.

The 14-th parameter P14 may include information in Table 9 below.

TABLE 9

| 14-th parameter | Value |
|---|---|
| Enter_MFD | 1 |
| Row_Num[1:0] | 10 |
| Row_State[2:0] | 101 |
| Row_Boundary1[15:0] | 0000 0000 1111 0000 (=240) |
| Row_Boundary2[15:0] | 0000 0111 1000 0000 (=1920) |
| C_Slice1[7:0] | 0101 0101 |
| C_Slice2[7:0] | Don't care |
| C_Slice3[7:0] | 1010 1010 |

The first command Enter_MFD and second command Row_Num[1:0] of the 14-th parameter P14 are the same as the first command Enter_MFD and second command Row_Num[1:0] of the 11-th parameter P11, so redundant descriptions are omitted.

When the third command Row_State[2:0] is '101', the first image signal A corresponding to the first display area DA1 and the third image signal C corresponding to the third display area DA3 are transmitted (or updated).

The fourth command Row_Boundary1[15:0] may indicate the last horizontal line of the first display area DA1. In an embodiment, when the fourth command Row_Boundary1 [15:0] is '0000 0000 1111 0000', the last horizontal line of the first display area DA1 is the 240-th horizontal line, for example.

The fifth command Row_Boundary2[15:0] may indicate the last horizontal line of the second display area DA2. In an embodiment, when the fifth command Row_Boundary2[15:0] is '0000 0111 1000 0000', the last horizontal line of the second display area DA2 is the 1920-th horizontal line, for example.

The sixth command C_Slice1[7:0] may indicate whether image signals corresponding to the slice areas of the first display area DA1 are updated. The sixth command C_Slice1 [7:0] of '0101 0101' indicates that the first left image signals LA corresponding to the odd-numbered slice areas SL1, SL3, SL5, and SL7 of the first display area DA1 are updated.

The seventh command C_Slice2[7:0] may indicate whether image signals corresponding to the slice areas of the second display area DA2 are updated.

The eighth command C_Slice3[7:0] indicates whether image signals corresponding to the slice areas of the third display area DA3 are updated. The eighth command C_Slice3[7:0] of '1010 1010' indicates that the third right image signals RC corresponding to the even-numbered slice areas SL66, SL68, SL14, . . . , and SL78 of the third display area DA3 are updated.

The driving controller 100 stores, in the memory 110, the first left image signals LA corresponding to the odd-numbered slice areas SL1, SL3, SL5, and SL7 of the first display area DA1 included in the 14-th transmit signal TS14 and the third right image signals RC corresponding to the even-numbered slice areas SL66, SL68, . . . , and SL78 of the third display area DA3. That is, the write signals M_W stored in the memory 110 are the first left image signal LA and the third right image signal RC.

The driving controller 100 may read an image signal from the memory 110 and transfer the image signal to the data driving circuit 200. In this case, the read signals M_R read by the driving controller 100 from the memory 110 includes image signals A' corresponding to the entirety of the first display area DA1 and image signals C' corresponding to the entirety of the third display area DA3. Here, the image signals A' includes the first left image signal LA which is currently updated (or belongs to a current frame) in the memory 110 and the first right image signal RA included in the 11-th transmit signal TS11, which is previously updated (or belongs to a previous frame). The image signals C' includes the third right image signal RC which is currently updated (or belongs to a current frame) in the memory 110 and the third left image signal LC included in the 11-th transmit signal TS11, which is previously updated (or belongs to a previous frame).

The 15-th transmit signal TS15 may include the first left image signal LA and the third right image signal RC.

The processor AP may not include the parameter in the transmit signal TS when there is no change in the parameter (or when a change in the parameter is not desired).

Because a parameter to be included in the 15-th transmit signal TS15 is the same as the 14-th parameter P14 of the previous 14-th transmit signal TS14, the 15-th transmit signal TS15 does not include the parameter.

For various reasons, the third right image signal RC corresponding to the third display area DA3 may be received after a predetermined time delay after the first left image signal LA corresponding to the first display area DA1 is received. The write signals M_W stored in the memory 110 are the first left image signal LA corresponding to the first display area DA1 and the third right image signal RC corresponding to the third display area DA3.

The driving controller 100 may read an image signal from the memory 110 and transfer the image signal to the data driving circuit 200. The read signals M_R read by the driving controller 100 from the memory 110 are the first left image signal LA corresponding to the first display area DA1.

In the example shown in FIG. 11, the time point when the driving controller 100 stores (or updates) the third right image signal RC corresponding to the third display area DA3 in the memory 110 is later than the time point when the driving controller 100 reads the third right image signal RC corresponding to the third display area DA3 from the memory 110. Therefore, the read signal M_R read by the driving controller 100 from the memory 110 includes only the first left image signal LA corresponding to the first display area DA1.

The 16-th transmit signal TS16 includes the 16-th parameter P16 and the first left image signal LA.

The 16-th parameter P16 may include information in Table 10 below.

TABLE 10

| 16-th parameter | Value |
|---|---|
| Enter_MFD | 1 |
| Row_Num[1:0] | 10 |
| Row_State[2:0] | 001 |
| Row_Boundary1[15:0] | 0000 0000 1111 0000 (=240) |
| Row_Boundary2[15:0] | Don't care |
| C_Slice1[7:0] | 0101 0101 |
| C_Slice2[7:0] | Don't care |
| C_Slice3[7:0] | 1010 1010 |

The first command Enter_MFD and second command Row_Num[1:0] of the 16-th parameter P16 are the same as the first command Enter_MFD and second command Row_Num[1:0] of the 11-th parameter P11, so redundant descriptions are omitted.

When the third command Row_State[2:0] is '001', the first image signal A corresponding to the first display area DA1 is transmitted (or updated). That is, the 16-th transmit signal TS16 may include the first left image signal LA.

The fourth command Row_Boundary1[15:0] may indicate the last horizontal line of the first display area DA1. In an embodiment, when the fourth command Row_Boundary1 [15:0] is '0000 0000 1111 0000', the last horizontal line of the first display area DA1 is the 240-th horizontal line, for example.

The fifth command Row_Boundary2[15:0] may indicate the last horizontal line of the second display area DA2.

The driving controller 100 may store the first left image signal LA included in the 16-th transmit signal TS16 in the memory 110. That is, the write signal M_W stored in the memory 110 may be the first image signal A corresponding to the first display area DA1.

The driving controller 100 may read an image signal from the memory 110 and transfer the image signal to the data driving circuit 200. The read signals M_R read by the driving controller 100 from the memory 110 are the first left image signal LA and the third right image signal RC corresponding to the first and third display areas DA1 and DA3.

The first left image signal LA corresponding to the first display area DA1 is an image signal included in the 16-th transmit signal TS16, and the third right image signal RC corresponding to the third display area DA3 is an image signal included in the previous 15-th transmit signal TS15.

By transmitting the transmit signal TS as shown in FIG. 11 to the driving controller 100 in the processor AP, the first operating frequency FREQ1 of the first display area DA1 of the electronic device DD may be sequentially 120 Hz, 120 Hz, 120 Hz, 60 Hz, 120 Hz, 120 Hz, and 120 Hz. The second operating frequency FREQ2 of the second display area DA2 of the electronic device DD may be 120 Hz, 60 Hz, and 24 Hz sequentially. The third operating frequency FREQ3 of the third display area DA3 of the electronic device DD may be 120 Hz, 30 Hz, 60 Hz and 120 Hz sequentially.

At the time point of transmitting the 15-th transmit signal TS15, the processor AP has attempted to change the third operating frequency FREQ3 of the third display area DA3 of the display panel DP from 30 Hz to 120 Hz. That is, the third operating frequency FREQ3 of the third display area DA3 of the electronic device DD needs to be sequentially changed to 120 Hz, 30 Hz, 120 Hz, and 120 Hz. However, because the third image signal C corresponding to the third display area DA3 was delayed, the third operating frequency FREQ3 of the third display area DA3 of the electronic device DD are sequentially 120 Hz, 30 Hz, 60 Hz and 120 Hz.

The processor AP may change the operating frequency of each of the plurality of areas of the display panel DP by transmitting the transmit signal TS to the driving circuit DD1.

Additionally, the processor AP may transmit some of the image signals of one horizontal line to the driving circuit DD1. Accordingly, power consumption of the electronic device DD may be minimized.

Although an embodiment of the disclosure has been described for illustrative purposes, those skilled in the art will appreciate that various modifications, and substitutions are possible, without departing from the scope and spirit of the invention as disclosed in the accompanying claims. Accordingly, the technical scope of the disclosure should not be limited to the contents described in the detailed description of the specification but should be defined by the claims.

The processor of the electronic device having the above-described configuration may transmit a transmit signal including information such as multi-frequency mode, number of frequency division areas, and transmission status of valid image signal to the driving circuit. The driving circuit may operate in the multi-frequency mode according to information provided from the processor.

That is, the processor may change the operating frequency of each of the plurality of areas of the electronic device by transmitting a transmit signal to the driving circuit.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. An electronic device comprising:

a processor configured to output a transmit signal including a parameter and an image signal;

a display panel; and a driving circuit configured to receive the transmit signal and display an image corresponding to the image signal on the display panel based on the parameter included in the transmit signal, wherein the parameter includes a first command indicating a multi-frequency mode, a second command indicating a number of display areas of the display panel, and a third command indicating whether the image signal corresponding to each of the display areas is transmitted.

2. The electronic device of claim 1, wherein the driving circuit includes a memory which stores the image signal.

3. The electronic device of claim 1, wherein, when the second command indicates that the number of display areas is three, the image signal includes a first image signal corresponding to a first display area, a second image signal corresponding to a second display area, and a third image signal corresponding to a third display area.

4. The electronic device of claim 3, wherein, when the first command indicates the multi-frequency mode, the image signal includes at least one of the first image signal, the second image signal, and the third image signal.

5. The electronic device of claim 4, wherein the parameter further includes a fourth command indicating information about a last horizontal line of the first display area and a fifth command indicating information about a last horizontal line of the second display area.

6. The electronic device of claim 5, wherein the driving circuit is configured to ignore the fourth command when the third command indicates that the first, second, and third image signals are all transmitted.

7. The electronic device of claim 5, wherein the driving circuit is configured to generate a vertical synchronization signal, a data enable signal, and a clock signal in response to the parameter.

8. The electronic device of claim 7, wherein the driving circuit is configured to deactivate the data enable signal and the clock signal for a time duration corresponding to the second display area and the third display area based on the fourth command when the third command indicates that the first image signal of the first, second, and third image signals is transmitted.

9. The electronic device of claim 7, wherein the driving circuit is configured to deactivate the data enable signal and the clock signal for a time duration corresponding to the second display area based on the fourth command and the fifth command when the third command indicates that the first and third image signals of the first, second, and third image signals are transmitted.

10. The electronic device of claim 3, wherein each of the first, second, and third display areas includes a plurality of odd-numbered slice areas and a plurality of even-numbered slice areas.

11. The electronic device of claim 10, wherein the first image signal includes first left image signals corresponding to the plurality of odd-numbered slice areas of the first display area and first right image signals corresponding to the plurality of even-numbered slice areas of the first display area, wherein the second image signal includes second left image signals corresponding to the plurality of odd-numbered slice areas of the second display area and second right image signals corresponding to the plurality of even-numbered slice areas of the second display area, and wherein the third image signal includes third left image signals corresponding to the plurality of odd-numbered slice areas of the third display area and third right image signals corresponding to the plurality of even-numbered slice areas of the third display area.

12. The electronic device of claim 11, wherein the parameter further includes a sixth command indicating whether a first left image signal and a first right image signal corresponding to the first display area, among the first left image signals and the first right image signals, are transmitted, a seventh command indicating whether a second left image signal and a second right image signal corresponding to the second display area, among the second right image signals and the second right image signals, are transmitted, and an eighth command indicating whether a third left image signal and a third right image signal of the third display area, among the third left image signals and the third right image signals, are transmitted.

13. The electronic device of claim 12, wherein the driving circuit includes a memory configured to store the first left image signal, the first right image signal, the second left image signal, the second right image signal, the third left image signal, and the third right image signal.

14. A driving circuit comprising:

a driving controller configured to receive a transmit signal including a parameter and an image signal and output an image data signal; and a data driving circuit configured to convert the image data signal into a data signal, wherein the parameter includes a first command indicating a multi-frequency mode, a second command indicating a number of display areas of a display panel, and a third command indicating whether the image signal corresponding to each of the display areas is transmitted.

15. The driving circuit of claim 14, wherein, when the first command indicates the multi-frequency mode and the second command indicates that the number of display areas is three, the image signal includes at least one of a first image signal corresponding to a first display area, a second image signal corresponding to a second display area, and a third image signal corresponding to a third display area.

16. The driving circuit of claim 15, wherein the parameter further includes a fourth command indicating information about a last horizontal line of the first display area and a fifth command indicating information about a last horizontal line of the second display area.

17. The driving circuit of claim 16, wherein the driving circuit is configured to ignore the fourth command when the third command indicates that the first, second, and third image signals are all transmitted.

18. The driving circuit of claim 16, wherein the driving circuit is configured to generate a vertical synchronization signal, a data enable signal, and a clock signal in response to the parameter.

19. The driving circuit of claim 18, wherein the driving circuit is configured to deactivate the data enable signal and the clock signal for a time duration corresponding to the second display area and the third display area based on the fourth command when the third command indicates that the first image signal of the first, second, and third image signals is transmitted.

20. The driving circuit of claim 18, wherein the driving circuit is configured to deactivate the data enable signal and the clock signal for a time duration corresponding to the second display area based on the fourth command and the fifth command when the third command indicates that the first and third image signals of the first, second, and third image signals are transmitted.

* * * * *